(12) United States Patent
Liu et al.

(10) Patent No.: US 12,416,775 B2
(45) Date of Patent: Sep. 16, 2025

(54) SPACER ASSEMBLY

(71) Applicant: GENIUS ELECTRONIC OPTICAL (XIAMEN) CO., LTD., Fujian (CN)

(72) Inventors: Junya Liu, Fujian (CN); Dongsheng Chen, Fujian (CN); Haibin Zhan, Fujian (CN); Ziwen Xu, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 811 days.

(21) Appl. No.: 17/115,810

(22) Filed: Dec. 9, 2020

(65) Prior Publication Data
US 2022/0128787 A1  Apr. 28, 2022

(30) Foreign Application Priority Data

Oct. 22, 2020  (CN) .......................... 202011136350.2

(51) Int. Cl.
*G02B 7/02* (2021.01)
*G02B 5/00* (2006.01)

(52) U.S. Cl.
CPC ............. *G02B 7/021* (2013.01); *G02B 5/003* (2013.01)

(58) Field of Classification Search
CPC ........ G02B 7/021; G02B 5/003; G02B 5/005; G02B 13/00; G02B 5/00; G02B 7/02; G03B 11/04
See application file for complete search history.

(56) References Cited

U.S. PATENT DOCUMENTS

| | | | |
|---|---|---|---|
| 2009/0284638 A1* | 11/2009 | Chang | G02B 7/021 348/335 |
| 2011/0050978 A1* | 3/2011 | Yano | G02B 27/0018 348/E5.025 |
| 2011/0149143 A1* | 6/2011 | Tsujino | H04N 23/51 359/356 |
| 2013/0003199 A1* | 1/2013 | Jeong | B29D 11/00375 264/1.7 |
| 2014/0104691 A1* | 4/2014 | Chang | G02B 7/021 359/611 |
| 2017/0115481 A1* | 4/2017 | Lin | G02B 7/021 |
| 2018/0299591 A1* | 10/2018 | Wei | G02B 27/0018 |
| 2018/0341048 A1* | 11/2018 | Chou | G02B 7/006 |
| 2020/0310074 A1* | 10/2020 | Wu | G02B 7/026 |
| 2021/0063614 A1* | 3/2021 | Gao | G02B 13/004 |

\* cited by examiner

*Primary Examiner* — Balram T Parbadia
(74) *Attorney, Agent, or Firm* — JCIPRNET

(57) ABSTRACT

A spacer assembly suitable of being applied in an optical imaging lens is provided. The spacer assembly includes a front spacer, a rear spacer, and a middle light-shielding sheet. The front spacer, the middle light-shielding sheet, and the rear spacer are sequentially arranged from an object side to an image side. Each of the front spacer and the rear spacer has an object-side mechanical surface facing the object side and an image-side mechanical surface facing the image side. The object-side mechanical surface of the rear spacer bears on the middle light-shielding sheet.

19 Claims, 14 Drawing Sheets

| | First embodiment | Second embodiment | Third embodiment | Fourth embodiment |
|---|---|---|---|---|
| GFB (mm) | 1.500 | 0.700 | 1.000 | 1.800 |
| $FR_{max}$ (mm) | 1.880 | 2.100 | 2.000 | 1.900 |
| $FR_{min}$ (mm) | 1.720 | 1.750 | 1.700 | 1.700 |
| $BR_{min}$ (mm) | 1.650 | 1.700 | 1.500 | 1.800 |
| SR (mm) | 1.400 | 1.335 | 1.400 | 1.200 |
| a2/a1 | 1.272 | 0.900 | 1.010 | 3.000 |
| a1'/a2' | 2.360 | 2.867 | 0.800 | 5.000 |
| FLD1/BLD1 | 0.910 | 1.000 | 0.910 | 0.910 |
| $FR_{max}/FR_{min}$ | 1.093 | 1.200 | 1.176 | 1.118 |
| $FR_{min}/SR$ | 1.229 | 1.311 | 1.214 | 1.417 |
| $BR_{min}/SR$ | 1.179 | 1.273 | 1.071 | 1.500 |

FIG. 14

SPACER ASSEMBLY

CROSS-REFERENCE TO RELATED APPLICATION

This application claims the priority benefit of China application serial no. 202011136350.2, filed on Oct. 22, 2020. The entirety of the above-mentioned patent application is hereby incorporated by reference herein and made a part of this specification.

BACKGROUND

Technical Field

The invention relates to a spacer assembly suitable of being applied in an optical imaging lens.

Description of Related Art

A part of light in an optical imaging lens may enter the interior of the optical imaging lens after being reflected by an inner diameter surface of a spacer to form unnecessary stray light. By changing a shape of the inner diameter surface of the spacer (for example, from an inclined surface to a curved surface), or expanding an inner diameter of the spacer, probability of light reaching the inner diameter surface of the spacer may be reduced. Although the curved surface of the spacer may guide light to a light-shielding sheet, a part of the light may still be reflected to the interior of the optical imaging lens. On the other hand, although the probability of light reaching the inner diameter surface of the spacer may be reduced by expanding the inner diameter of the spacer, the inner diameter of the spacer cannot be expanded indefinitely considering manufacturability and supportability of the spacer. Therefore, how to prevent unnecessary stray light from entering the interior of the optical imaging lens while considering the manufacturability and supportability of the spacer as well as the optical quality is an important development key of the related technical field.

SUMMARY

The invention is directed to a spacer assembly, which is suitable of being applied in an optical imaging lens with an optical axis, and adapted to absorb unnecessary light, so that the optical imaging lens has good optical quality.

An embodiment of the invention provides a spacer assembly suitable of being applied in an optical imaging lens with an optical axis. The spacer assembly includes a front spacer, a rear spacer and a middle light-shielding sheet. An optical element, the front spacer, the middle light-shielding sheet and the rear spacer are sequentially arranged from an object side to an image side. Each of the front spacer and the rear spacer has an object-side mechanical surface facing the object side and an image-side mechanical surface facing the image side. The object-side mechanical surface of the front spacer has a first area, the first area is a bearing area with the optical element, the image-side mechanical surface of the front spacer has a second area, and the second area is a bearing area with the middle light-shielding sheet, and a ratio of the second area to the first area of the front spacer is greater than or equal to 0.850. The object-side mechanical surface of the rear spacer bears on the middle light-shielding sheet.

An embodiment of the invention provides a spacer assembly suitable of being applied in an optical imaging lens with an optical axis. The spacer assembly includes a front spacer, a rear spacer and a middle light-shielding sheet. The front spacer, the middle light-shielding sheet, the rear spacer and an optical element are sequentially arranged from an object side to an image side. Each of the front spacer and the rear spacer has an object-side mechanical surface facing the object side and an image-side mechanical surface facing the image side. The object-side mechanical surface of the rear spacer has a first area, the first area is a bearing area with the middle light-shielding sheet, the image-side mechanical surface of the rear spacer has a second area, and the second area is a bearing area with the optical element, and a ratio of the first area to the second area of the rear spacer is greater than or equal to 0.700. The object-side mechanical surface of the front spacer bears on the middle light-shielding sheet.

Based on the above description, the optical imaging lens including the spacer assembly of the embodiment of the invention may have good optical quality and manufacturability by satisfying one of the aforementioned conditional expressions.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 14 shows a relationship of important parameters in the optical imaging lens of each embodiment.

DESCRIPTION OF THE EMBODIMENTS

Figure 1:
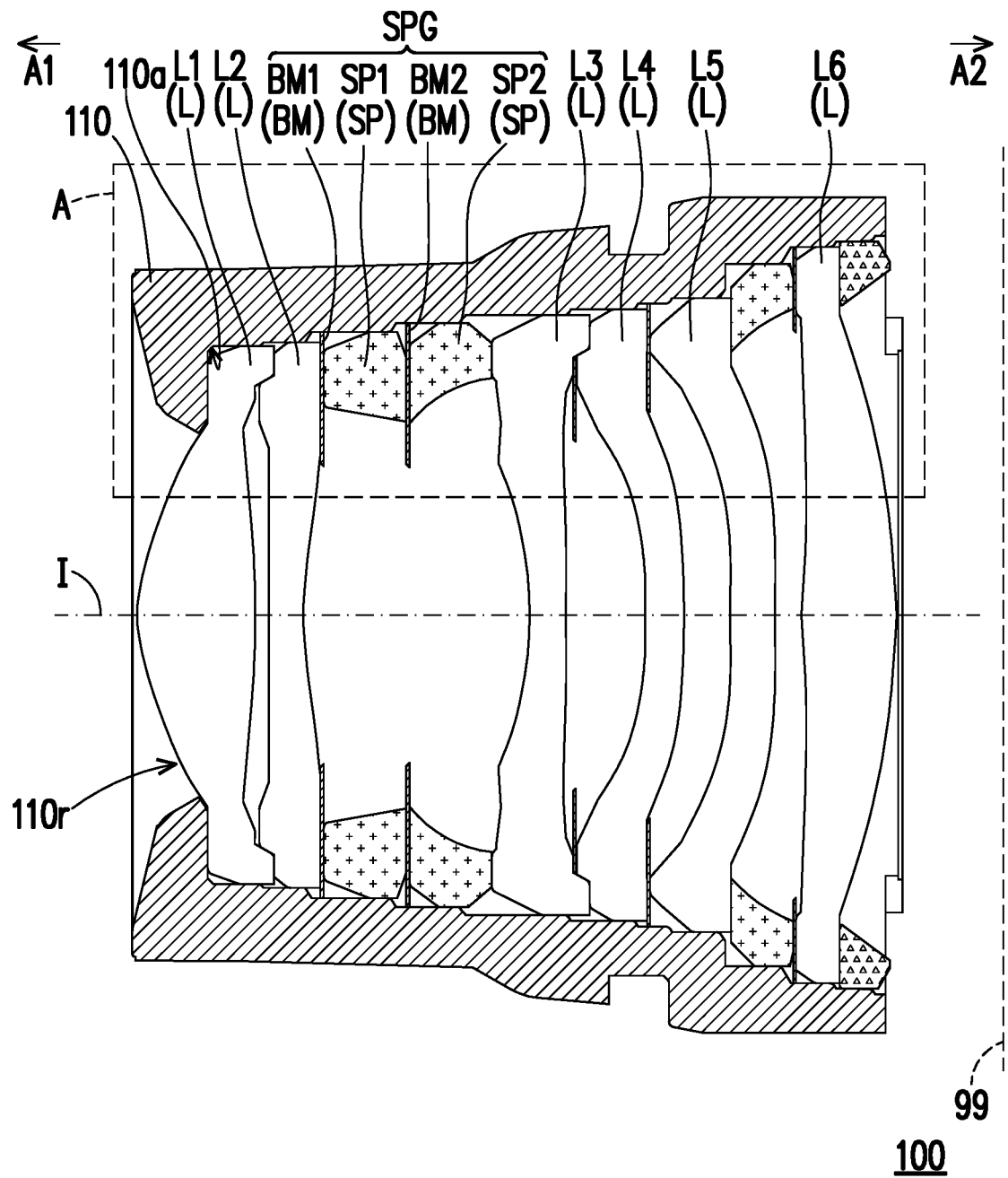
FIG. 1 is a schematic cross-sectional view of an optical imaging lens according to a first embodiment of the invention.

Referring to FIG. 1, in the embodiment, an optical imaging lens 100 may be selectively applied to a portable electronic device (such as a mobile phone, a camera, a head-mounted display, etc.), but the invention is not limited thereto. The optical imaging lens 100 includes a lens barrel 110, a plurality of optical elements, and a spacer assembly SPG. The spacer assembly SPG includes a plurality of spacers SP and at least one light-shielding sheet BM, where the optical elements include lens elements L, light-shielding sheets BM and the spacers SP.

The lens barrel 110 refers to an element used to install the lens elements L, which has a function of protecting the lens elements L and an internal optical path of the optical imaging lens 100. The lens barrel 110 has an inner circumferential surface 110a surrounding an optical axis I of the optical imaging lens 100, the inner circumferential surface 110a is used to define an installation space 110r, and the installation space 110r is used to accommodate a plurality of optical elements and the spacer assembly SPG.

Each of the lens elements L is, for example, an optical element having a refractive power. In the embodiment of the invention, a number of the lens elements L is at least two. For example, in the embodiment of FIG. 1, the optical imaging lens 100 includes six lens elements L1, L2, L3, L4, L5 and L6. In other embodiments, the number of the lens elements L of the optical imaging lens 100 may also be less than six or more than six, for example, three, four, five, seven, eight, or nine. The number of the lens elements L is not limited by the invention.

Figure 2:
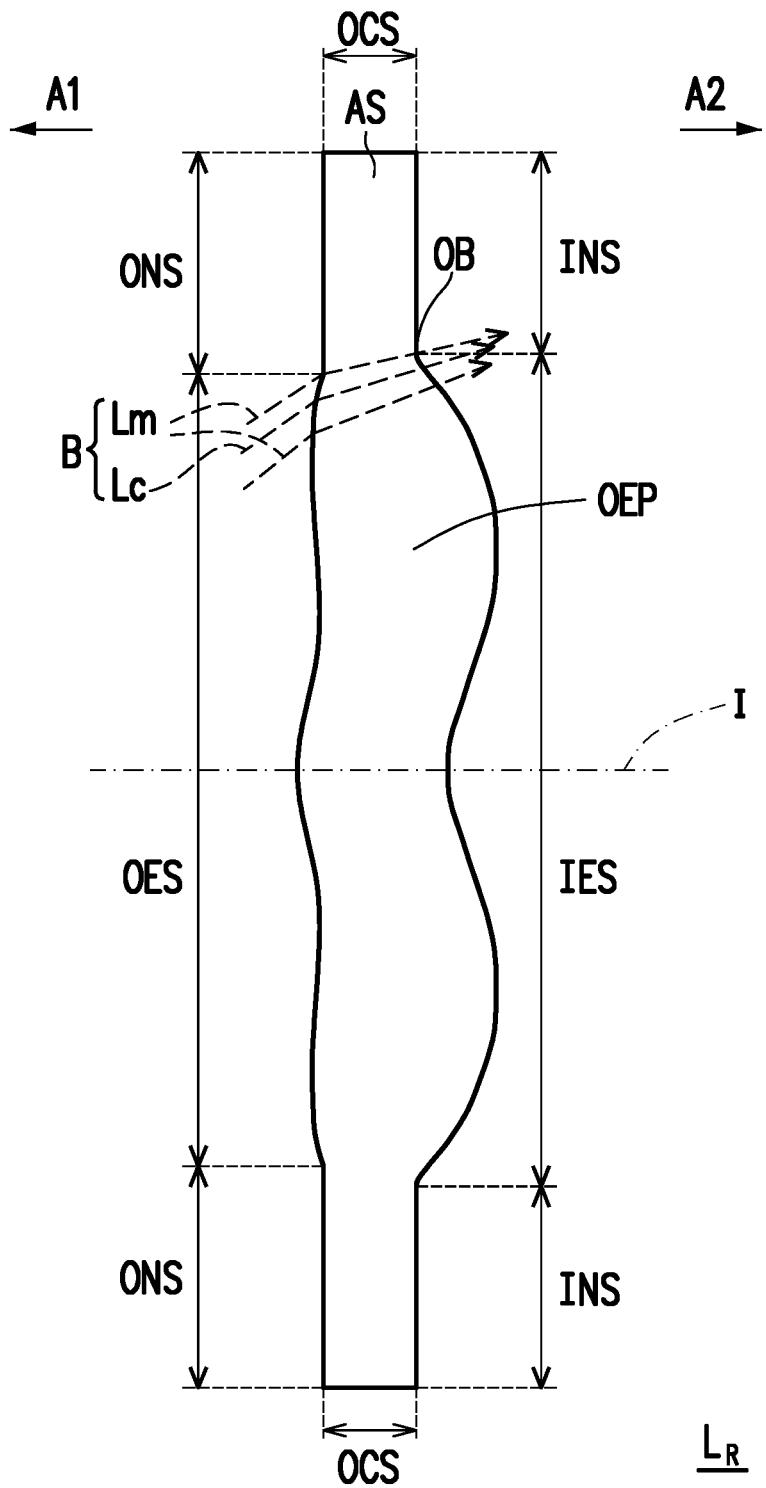
FIG. 2 is a radial schematic diagram of a reference lens element of an optical imaging lens according to an embodiment of the present invention.

Referring to FIG. 2, a lens element $L_R$ of FIG. 2 is taken as an example to describe the above-mentioned lens elements L. In detail, according to different functions, each lens element L may be divided into an optical effective portion OEP and an assembling portion AS. Referring to FIG. 2, the lens element $L_R$ may accept imaging ray B that is incident to the optical imaging lens 100 in an angle from being parallel to the optical axis I to an angle of half field of view (HFOV) with respect to the optical axis I, and the imaging ray B is imaged on an image plane 99 (shown in FIG. 1) through the optical imaging lens 100, and the optical effective portion OEP is defined by the imaging ray B. The optical effective portion OEP has an object-side optical effective surface OES facing an object side A1 and an image-side optical effective surface IES facing an image side A2. In the embodiment of the invention, the "object-side optical effective surface OES (or the image-side optical effective surface IES) of the lens element $L_R$" is defined as a specific range where the imaging ray B passes the lens through the surface facing the object side A1 (or the surface facing the image side A2). Moreover, the lens element $L_R$ may also include the assembling portion AS extending radially outward from an optical boundary OB, where the imaging ray B includes at least two types of ray: chief ray Lc and marginal ray Lm, and the optical boundary OB on the surface of the lens element $L_R$ is defined as a point where the marginal ray Lm passing through a radial outermost edge of the lens surface intersects the lens surface. The assembling portion AS is generally configured to assemble the lens element $L_R$ to the lens barrel 110 (shown in FIG. 1). Ideally, the imaging ray B is not expected to reach the assembling portion AS, so that the assembling portion AS may also be regarded as a non-optical effective portion of the lens element $L_R$. In the assembling portion AS, a surface facing the object side A1 is referred to as an object-side non-optical effective surface ONS, and a surface facing the image side A2 is referred to as an image-side non-optical effective surface INS, where the object-side non-optical effective surface ONS is connected to the object-side optical effective surface OES, and the image-side non-optical effective surface INS is connected to the image-side optical effective surface IES. The lens element $L_R$ further has an outer connecting surface OCS connecting the object-side non-optical effective surface ONS and the image-side non-optical effective surface INS. The outer connecting surface OCS of the lens element $L_R$ faces away from the optical axis I; in other words, the outer connecting surface OCS of the lens element $L_R$ faces the inner circumferential surface 110a of the lens barrel 110 (shown in FIG. 1).

It should be noted that the shapes of the surfaces of the lens elements $L_R$ and L in the drawings of the invention are only for an illustrative purpose, and are not intended to limit the scope of the invention.

Referring to FIG. 1, the spacer assembly SPG is used to space a plurality of the lens elements L and block unnecessary light. Referring to FIG. 1 and FIG. 2, the spacer assembly SPG includes a plurality of spacers SP and at least one light-shielding sheet BM, where the spacers SP include a front spacer SP1 and a rear spacer SP2, the at least one light-shielding sheet BM includes a middle light-shielding sheet BM2, and the front spacer SP1, the middle light-shielding sheet BM2, and the rear spacer SP2 are sequentially arranged from the object side A1 to the image side A2.

In the embodiment of FIG. 1, the spacer assembly SPG may further selectively include a front light-shielding sheet BM1, which is arranged between the front spacer SP1 and a first lens element L (for example: the lens element L2) obtained when counting from the front spacer SP1 toward the object side A1. In the embodiment, a number of the light-shielding sheets BM of the spacer assembly SPG is, for example, two (i.e., the front light-shielding sheet BM1 and the middle light-shielding sheet BM2). However, the invention is not limited thereto. In other embodiments, the number of the light-shielding sheets BM of the spacer assembly SPG may also be other numbers other than two, such as one or three, and the invention does not limit the number of the light-shielding sheets BM of the spacer assembly SPG.

Figure 3:
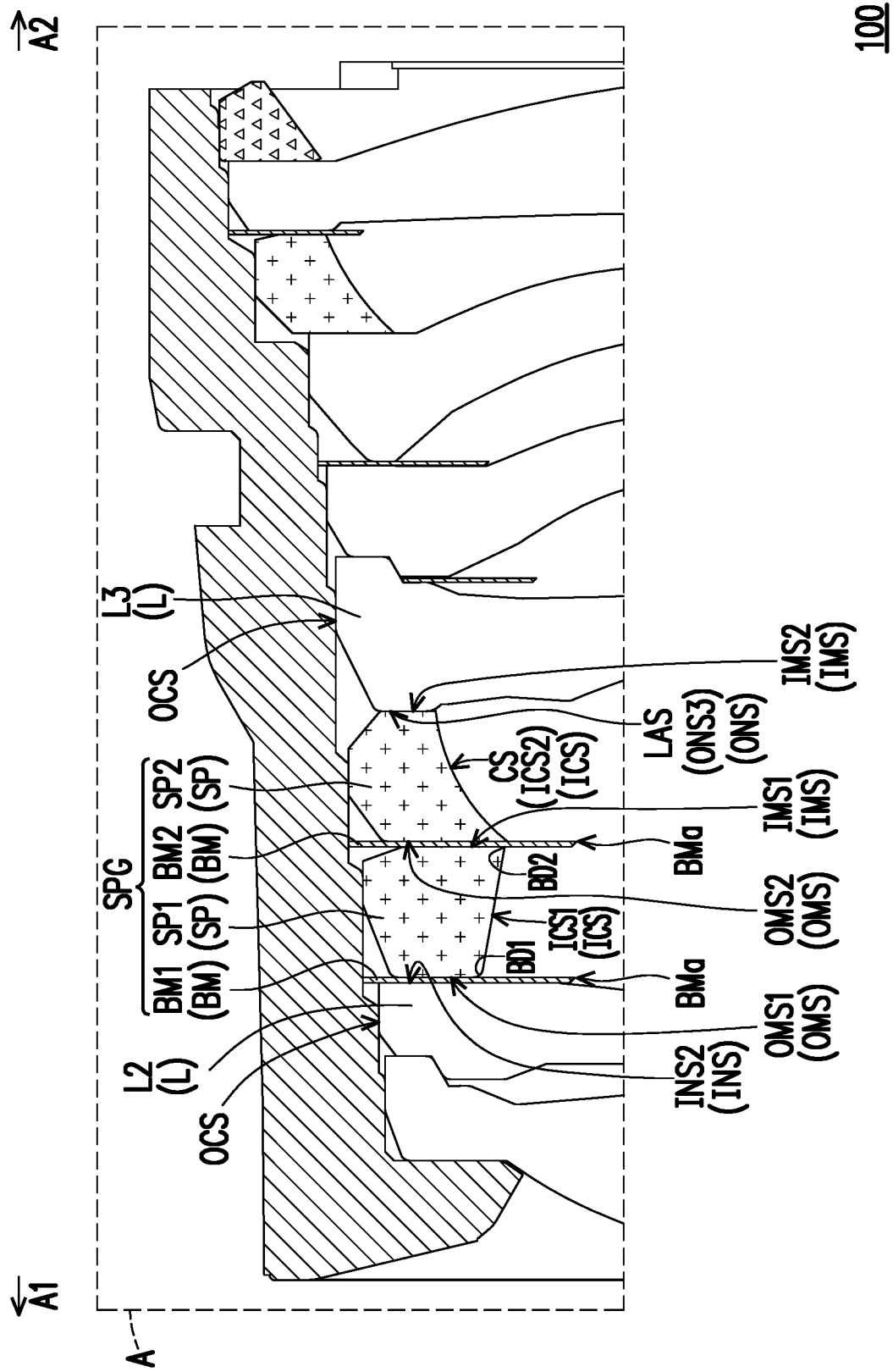
FIG. 3 is an enlarged schematic view of an area A in FIG. 1.

Referring to FIG. 1 and FIG. 3, each spacer SP has an object-side mechanical surface OMS, an image-side mechanical surface IMS, and an inner connecting surface ICS, where the object-side mechanical surface OMS and the image-side mechanical surface IMS respectively face the object side A1 and the image side A2, and the inner connecting surface ICS connects the object-side mechanical surface OMS and the image-side mechanical surface IMS and faces the optical axis I. Each light-shielding sheet BM has an inner edge BMa facing the optical axis I.

Referring to FIG. 1 and FIG. 2, in the optical imaging lens 100, the lens elements L are sequentially arranged along the optical axis I of the optical imaging lens 100 from the object side A1 to the image side A2, and the spacer assembly SPG is sandwiched between the assembling portions AS of two adjacent lens elements L.

Referring to FIG. 1 and FIG. 3, for example, in the embodiment, the lens elements L of the optical imaging lens 100 include the lens elements L1-L6 sequentially arranged along the optical axis I from the object side A1 to the image side A2, and the spacer assembly SPG may be selectively sandwiched between an image-side non-optical effective surface INS2 of the lens element L2 and an object-side non-optical effective surface ONS3 of the lens element L3. However, the invention is not limited thereto, and in other embodiments, the spacer assembly SPG may also be sandwiched between the assembling portions AS of other two adjacent lens elements L.

Referring to FIG. 1 and FIG. 3, in the optical imaging lens 100 of the embodiment, the front light-shielding sheet BM1 is sandwiched between the image-side non-optical effective surface INS2 of the lens element L2 and the object-side mechanical surface OMS1 of the front spacer SP1, the object-side mechanical surface OMS1 of the front spacer SP1 directly bears on the front light-shielding sheet BM1, the image-side mechanical surface IMS1 of the front spacer SP1 directly bears on the middle light-shielding sheet BM2, the middle light-shielding sheet BM2 is sandwiched between the image-side mechanical surface IMS1 of the front spacer SP1 and the object-side mechanical surface OMS2 of the rear spacer SP2, the object-side mechanical surface OMS2 of the rear spacer SP2 directly bears on the middle light-shielding sheet BM2, and the image-side mechanical surface IMS2 of the rear spacer SP2 directly bears on the object-side non-optical effective surface ONS3 of the lens element L3.

It should be noted that when light emitted by an object to be photographed (not shown) enters the optical imaging lens 100 from the object side A1, and passes through the lens element L1 to the lens element L6, an image is formed on the image plane 99, the object side A1 is a side facing the object to be photographed, and the image side A2 is a side facing the image plane 99.

In the following paragraphs, various parameters of the embodiment of the invention are described in detail with reference of FIG. 3 to FIG. 4.

Figure 4:
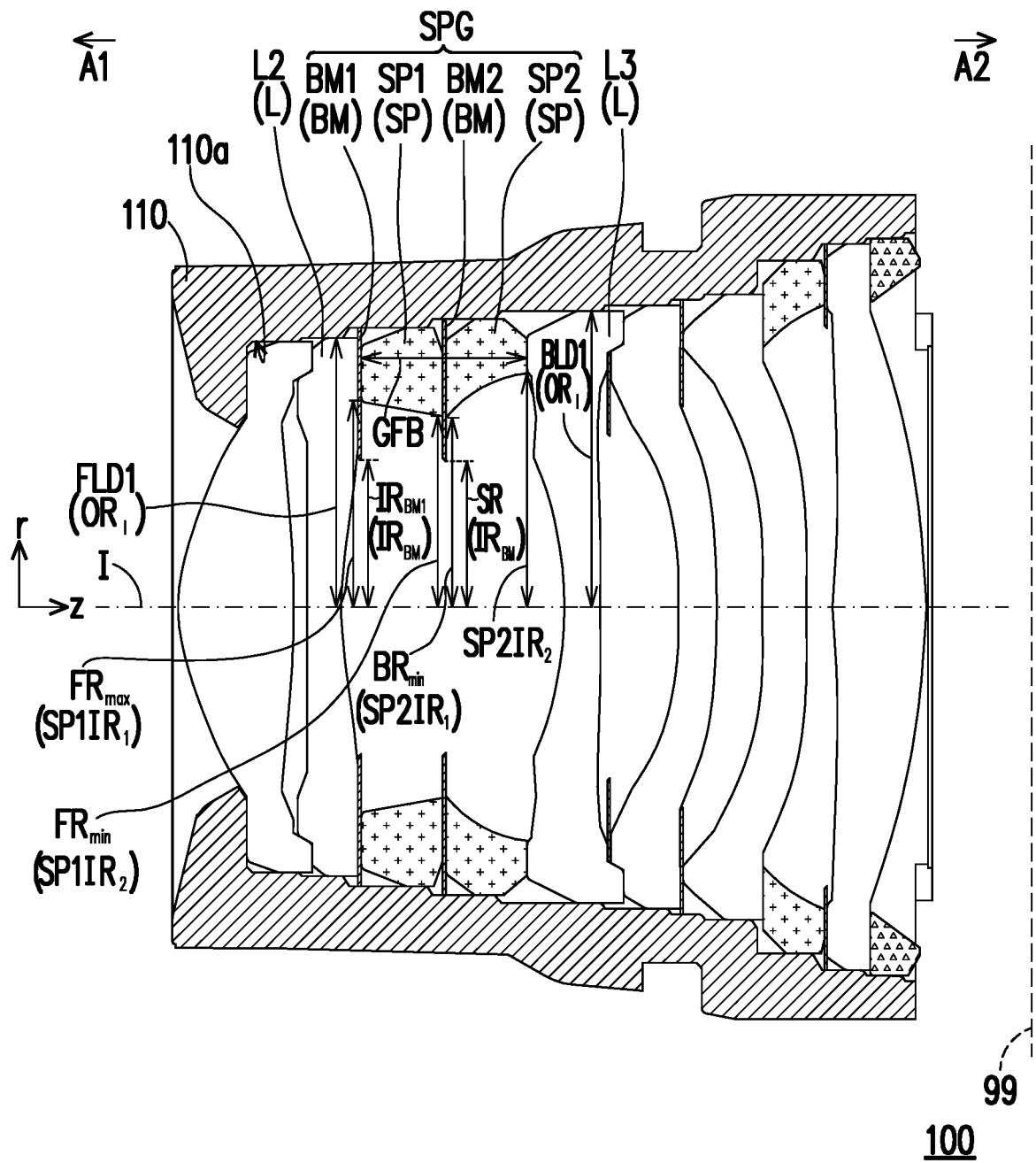
FIG. 4 is a schematic diagram illustrating various parameters of the embodiment of FIG. 1.

Referring to FIG. 3 to FIG. 4, the parameters are defined as follows:

(a2/a1) is a ratio of a second area a2 to a first area a1 of the front spacer SP1, where an optical element (for example: the front light-shielding sheet BM1), the front spacer SP1, the middle light-shielding sheet BM2 and the rear spacer SP2 are sequentially arranged from the object side A1 to the image side A2, the object-side mechanical surface OMS1 of the front spacer SP1 has the first area a1, and the first area a1 is a bearing area with the optical element (for example, the front light-shielding sheet BM1), and the image-side mechanical surface IMS1 of the front spacer SP1 has the second area a2, and the second area a2 is a bearing area with the middle light-shielding sheet BM2;

(a1'/a2') is a ratio of a first area a1' to a second area a2' of the rear spacer SP2, where the object-side mechanical surface OMS2 of the rear spacer SP2 has the first area a1', and the first area a1' is a bearing area with the middle light-shielding sheet BM2, the image-side mechanical surface IMS2 of the rear spacer SP2 has the second area a2', and the second area a2' is a bearing area with an optical element (for example: the lens element L3);

$OR_1$ is a maximum distance between the outer connecting surface OCS of each lens element L and the optical axis I in a vertical direction r, and $OR_1$ is an outer diameter of each lens element L, where the vertical direction r is perpendicular to the optical axis I;

FLD1 is the outer diameter $OR_1$ of a first lens element L (for example: the lens element L2) obtained when counting from the spacer assembly SPG toward the object side A1;

BLD1 is the outer diameter $OR_1$ of a first lens element L (for example: the lens element L3) obtained when counting from the spacer assembly SPG toward the image side A2;

$SP1IR_1$ is a distance between a first boundary BD1 of the object-side mechanical surface OMS and the inner connecting surface ICS of the front spacer SP1 and the optical axis I in the vertical direction r, $SP1IR_1$ is a first inner diameter of the front spacer SP1;

$SP1IR_2$ is a distance between a second boundary BD2 of the image-side mechanical surface IMS and the inner connecting surface ICS of the front spacer SP1 and the optical axis I in the vertical direction r, $SP1IR_2$ is a second inner diameter of the front spacer SP1;

$SP2IR_1$ is a distance between the first boundary BD1 of the object-side mechanical surface OMS and the inner connecting surface ICS of the rear spacer SP2 and the optical axis I in the vertical direction r, $SP1IR_2$ is a first inner diameter of the rear spacer SP2;

$SP2IR_2$ is a distance between the second boundary BD2 of the image-side mechanical surface IMS and the inner connecting surface ICS of the rear spacer SP2 and the optical axis I in the vertical direction r, $SP2IR_2$ is a second inner diameter of the rear spacer SP2;

$FR_{min}$ is a minimum inner diameter of the front spacer SP1, i.e., a minimum distance between the inner connecting surface ICS1 of the front spacer SP1 and the optical axis I in the vertical direction r;

$BR_{min}$ is a minimum inner diameter of the rear spacer SP2, i.e., a minimum distance between the inner connecting surface ICS2 of the rear spacer SP2 and the optical axis I in the vertical direction r;

$FR_{max}$ is a maximum inner diameter of the front spacer SP1, i.e., a maximum distance between the inner connecting surface ICS1 of the front spacer SP1 and the optical axis I in the vertical direction r;

$IR_{BM}$ is a minimum distance between the inner edge BMa of each light-shielding sheet BM and the optical axis I in the vertical direction r, and $IR_{BM}$ is a minimum inner diameter of each light-shielding sheet BM;

SR is a minimum inner diameter $IR_{BM}$ of the middle light-shielding sheet BM2;

$IR_{BM1}$ is a minimum inner diameter $IR_{BM}$ of the front light-shielding sheet BM1;

GFB is a minimum distance between the image-side non-optical effective surface INS of a first lens element L (for example: the lens element L2) obtained when counting from the middle light-shielding sheet BM2 toward the object side A1 and the object-side non-optical effective surface ONS of a first lens element L (for example: the lens element L3) obtained when counting from the middle light-shielding sheet BM2 toward the image side A2 in a horizontal direction z parallel to the optical axis I, and GFB is a space between lens bearing surfaces.

In addition, a relationship of the important parameters in the optical imaging lens 100 of the first embodiment is shown in FIG. 14.

Technical effects of the design of the embodiment are described in detail in the following paragraphs.

Referring to FIG. 1 and FIG. 3 and FIG. 4, in the optical imaging lens 100, an optical element (for example: the front light-shielding sheet BM1), the front spacer SP1, the middle light-shielding sheet BM2, and the rear spacer SP2 are sequentially arranged from the object side A1 to the image side A2; the object-side mechanical surface OMS1 of the front spacer SP1 has the first area a1, and the first area a1 is the bearing area with the optical element (for example: the front light-shielding sheet BM1); alternatively, the first area a1 is a contact area with the optical element (for example: the front light-shielding sheet BM1); the image-side mechanical surface IMS1 of the front spacer SP1 has a second area a2, and the second area a2 is the bearing area with the middle light-shielding sheet BM2; alternatively, the second area a2 is a contact area with the middle light-shielding sheet BM2; the ratio (a2/a1) of the second area a2 to the first area a1 of the front spacer SP1 is greater than or equal to 0.850, i.e., the optical imaging lens 100 satisfies a following conditional expression: (a2/a1)≥0.850.

The ratio (a2/a1) of the second area a2 to the first area a1 of the front spacer SP1 is greater than or equal to 0.850; i.e., the front light-shielding sheet BM1 and the front spacer SP1 have a sufficient contact area so that the front light-shielding sheet BM1 is not easily deformed and warped after being assembled or subjected to force, and the front light-shielding sheet BM1 may effectively absorb unnecessary light, thereby improving optical quality.

Referring to FIG. 1 and FIG. 3 and FIG. 4, the object-side mechanical surface OMS2 of the rear spacer SP2 has the first area a1', and the first area a1' is the bearing area with the middle light-shielding sheet BM2, and the image-side mechanical surface IMS2 of the rear spacer SP2 has the second area a2', the second area a2' is the bearing area with an optical element (for example: the lens element L3), and the ratio of the first area a1' to the second area a2' of the rear spacer SP2 is greater than or equal to 0.700, i.e., the optical imaging lens 100 satisfies a following conditional expression: (a1'/a2')≥0.700.

Namely, a ratio of the contact area of the middle light-shielding sheet BM2 and the rear spacer SP2 to the contact area of the rear spacer SP2 and a rear light-shielding sheet BM3 is maintained in a certain range; if the above ratio is less than 0.700, the middle light-shielding sheet BM2 and/or the rear light-shielding sheet BM3 are easily deformed and warped after being assembled or subjected to force, making it unable to effectively absorb unnecessary light, thereby adversely affecting the optical imaging quality.

Referring to FIG. 1 and FIG. 4, in the optical imaging lens 100, the outer diameter $OR_1$ of a first lens element L (for example: the lens element L2) obtained when counting from the spacer assembly SPG toward the object side A1 is FLD1, and the outer diameter $OR_1$ of a first lens element L (for example: the lens element L3) obtained when counting from the spacer assembly SPG toward the image side A2 is BLD1, and the optical imaging lens 100 satisfies a following conditional expression: 0.850≤(FLD1/BLD1)≤1.150.

In order to reduce an overall volume of the optical imaging lens 100, in addition to reducing thicknesses of the lens elements L and an air gap between the lens elements L, to reduce the outer diameter $OR_1$ of the lens elements L is also one of the improvement methods. If a difference between optical effective diameters (i.e., distances between the optical boundaries OB of the lens elements L and the optical axis I in the vertical direction r) of two adjacent lens elements L is too large, in order to make the non-optical effective portion (i.e., the assembling portion AS) of the lens element L to have an enough bearing space, and considering suppression of stray light, the lens element L with a larger outer diameter $OR_1$ is often used in collaboration with a light-shielding sheet BM with a smaller inner diameter or a bending light-shielding sheet BM to meet the above needs. However, expansion of the outer diameter $OR_1$ of the lens element L is of no avail for reducing the volume of the optical imaging lens 100. The ratio (FLD1/BLD1) of the outer diameters $OR_1$ of the two adjacent lens elements L is controlled between 0.850 and 1.150. Namely, the optical imaging lens 100 satisfies a following conditional expression: 0.850≤(FLD1/BLD1)≤1.150. A difference between FLD1 and BLD1 is less than or equal to 15%, and a size of the inner diameter of the spacer is enlarged in collaboration with a suitable light-shielding sheet BM and/or the object-side non-optical effective surface ONS and/or the image-side non-optical effective surface INS of the lens element L are designed as a light-absorbing surface, in case that the outer diameter $OR_1$ of the lens element L is not excessively increased, the lens element L may not only have enough space to support the adjacent optical element, but also serious stray light is not produced, so as to achieve good optical quality and the effect of small volume.

Referring to FIG. 1 and FIG. 4, the larger a space between lens bearing surfaces (i.e. the GFB) is, the more the unnecessary light is reflected to enter the interior of the optical imaging lens 100. In case that the manufacturability and optical quality of the spacer SP are taken into account, the space between the lens bearing surfaces (i.e. the GFB) is at least greater than or equal to 0.600 mm, i.e., the optical imaging lens 100 satisfies a following conditional expression: GFB≥0.600 mm.

Referring to FIG. 1 and FIG. 4, in the optical imaging lens 100, the first inner diameter $SP1IR_1$ of the front spacer SP1 is greater than the second inner diameter $SP1IR_2$ of the front spacer SP1, i.e., the optical imaging lens 100 satisfies a following conditional expression: $SP1IR_1 > SP1IR_2$. In this way, the image-side mechanical surface IMS of the front spacer SP1 may provide a sufficient area for the middle light-shielding sheet BM2 to bear on, so as to avoid deformation of the middle light-shielding sheet BM2.

Referring to FIG. 1, FIG. 3 and FIG. 4, in the optical imaging lens 100, the first inner diameter $SP2IR_1$ of the rear spacer SP2 is less than the second inner diameter $SP2IR_2$ of the rear spacer SP2, i.e., the optical imaging lens 100 satisfies a following conditional expression: $SP2IR_1 < SP2IR_2$. Therefore, the object-side mechanical surface OMS2 of the rear spacer SP2 may provide a sufficient area for the middle light-shielding sheet BM2 to bear on, so as to avoid deformation of the middle light-shielding sheet BM2. In addition, the larger second inner diameter $SP2IR_2$ of the rear spacer SP2 may reduce a chance that the imaging ray is reflected by the inner connecting surface ICS2 of the rear spacer SP2, thereby reducing the adverse effect of the spacer assembly SPG on the imaging quality.

Referring to FIG. 1, FIG. 3, and FIG. 4, in the optical imaging lens 100, the inner connecting surface ICS2 of the rear spacer SP2 includes an arc-shaped curved surface CS. The arc-shaped curved surface CS is a concave surface. The object-side non-optical effective surface ONS3 of a first lens element L (for example: the lens element L3) obtained when counting from the spacer assembly SPG toward the image side A2 is a light-absorbing surface LAS. The arc-shaped curved surface CS of the rear spacer SP2 may guide light to the light-absorbing surface LAS of the lens element L3, which helps to reduce stray light and effectively improve the imaging quality.

Referring to FIGS. 1, 3, and 4, in the optical imaging lens 100, the front spacer SP1 has a minimum inner diameter $FR_{min}$ and a maximum inner diameter $FR_{max}$, and the optical imaging lens 100 satisfies a following conditional expression: $(FR_{max}/FR_{min}) \leq 1.200$. Namely, a change in the inner diameter of the front spacer SP1 is small, and the front spacer SP1 is easy to be processed. In addition, a ratio of the maximum inner diameter $FR_{max}$ to the minimum inner diameter $FR_{min}$ of the front spacer SP1 ($FR_{max}/FR_{min}$) is maintained within a certain range, i.e., the inner connecting surface ICS1 of the front spacer SP1 has no part being particularly biased toward the optical axis I. Therefore, the chance that the imaging ray is reflected by the inner connecting surface ICS1 of the front spacer SP1 may be reduced, thereby improving the imaging quality.

Referring to FIG. 1, FIG. 3 and FIG. 4, in the optical imaging lens 100, the minimum inner diameter SR of the middle light-shielding sheet BM2 is less than the minimum inner diameter $FR_{min}$ of the front spacer SP1 and the minimum inner diameter $BR_{min}$ of the rear spacer SP2. In other words, when viewed from the optical axis I toward the inner circumferential surface 110a of the lens barrel 110, the middle light-shielding sheet BM2 protrudes from the front spacer SP1 and the rear spacer SP2. The middle light-shielding sheet BM2 is used to absorb unnecessary light to maximize the inner diameter of the front spacer SP1 or the rear spacer SP2 as far as possible, so as to prevent light from being reflected into the optical imaging lens by the inner connecting surface ICS1 of the front spacer SP1 or the inner connecting surface ICS2 of the rear spacer SP2 to produce stray light.

Referring to FIG. 1, FIG. 3, and FIG. 4, in the optical imaging lens 100, the spacer assembly SPG further includes the front light-shielding sheet BM1, which is arranged between a first lens element L (for example: the lens element L2) obtained when counting from the front spacer SP1 toward the object side A1 and the front spacer SP1. The use of the front light-shielding sheet BM1 may simplify a manufacturing process of the lens element L2, so that the lens element L2 may be assembled after molding without performing any other processing procedures (such as ink coating).

Referring to FIG. 1, FIG. 3 and FIG. 4, in the optical imaging lens 100, the object-side non-optical effective surface ONS3 of a first lens element L (for example, the lens element L3) obtained when counting from the spacer assembly SPG toward the image side A2 is the light-absorbing surface LAS. The light-absorbing surface LAS of the object-side non-optical effective surface ONS3 of the lens element L3 may absorb unnecessary light to reduce generation of stray light, and save the use of the light-shielding sheet between the rear spacer SP2 and the lens element L3. Thus, an assembling time of the optical imaging lens 100 may be shortened to reduce the production cost.

Referring to FIG. 1, FIG. 3, and FIG. 4, in the optical imaging lens 100, the middle light-shielding sheet BM2 is disposed between the front spacer SP1 and the rear spacer SP2, and the front spacer SP1 and the rear spacer SP2 are separated by the middle light-shielding sheet BM2 without contacting each other. In order to enlarge the inner diameter of each spacer SP and take into account the bearing area of each spacer SP and the light-shielding sheet BM, the best effect may be achieved by directly sandwiching the light-shielding sheet BM between the front spacer SP1 and the rear spacer SP2. If the front spacer SP1 and the rear spacer SP2 are fitted and contacted, not only a larger size is required for manufacturability, but also the bearing area between the spacer SP and the light-shielding sheet BM is sacrificed, resulting in easy warpage of the light-shielding sheet BM.

Referring to FIG. 1, FIG. 3 and FIG. 4, in the optical imaging lens 100, the front spacer SP1 has the smallest inner diameter $FR_{min}$, the middle light-shielding sheet BM2 has the smallest inner diameter SR, and the optical imaging lens 100 satisfies a following conditional expression: $FR_{min}/SR \leq 1.600$. In this way, the stray light generated by the large field of view light reflected by the inner connecting surface ICS1 of the front spacer SP1 may be reduced.

Referring to FIG. 1, FIG. 3, and FIG. 4, in the optical imaging lens 100, the middle light-shielding sheet BM2 has the smallest inner diameter SR, the rear spacer SP2 has the smallest inner diameter $BR_{min}$, and the optical imaging lens 100 satisfies a following conditional expression: $BR_{min}/SR \leq 1.600$. In this way, the stray light generated by the large field of view reflected by the inner connecting surface ICS2 of the rear spacer SP2 may be reduced.

Referring to FIG. 1, FIG. 3, and FIG. 4 at the same time, in the optical imaging lens 100, a material of at least one of the front spacer SP1 and the rear spacer SP2 includes plastic. By using plastic as the material of the spacer SP, a processing time of the spacer SP is shorter, which avails mass production. However, the invention does not limit the material of the spacer SP. In another embodiment, in the optical imaging lens 100, the material of at least one of the front spacer SP1 and the rear spacer SP2 also includes metal, and a metal surface may be blackened. By using metal as the material of the spacer SP, the spacer SP has stronger structural rigidity and is less likely to be deformed or damaged during assembly.

It should be noticed that a part of contents of the aforementioned embodiment are also used in the following embodiment, where descriptions of the same technical contents are omitted. The aforementioned embodiment may be referred for descriptions of the omitted parts, and detailed descriptions thereof are not repeated in the following embodiment.

Figure 5:
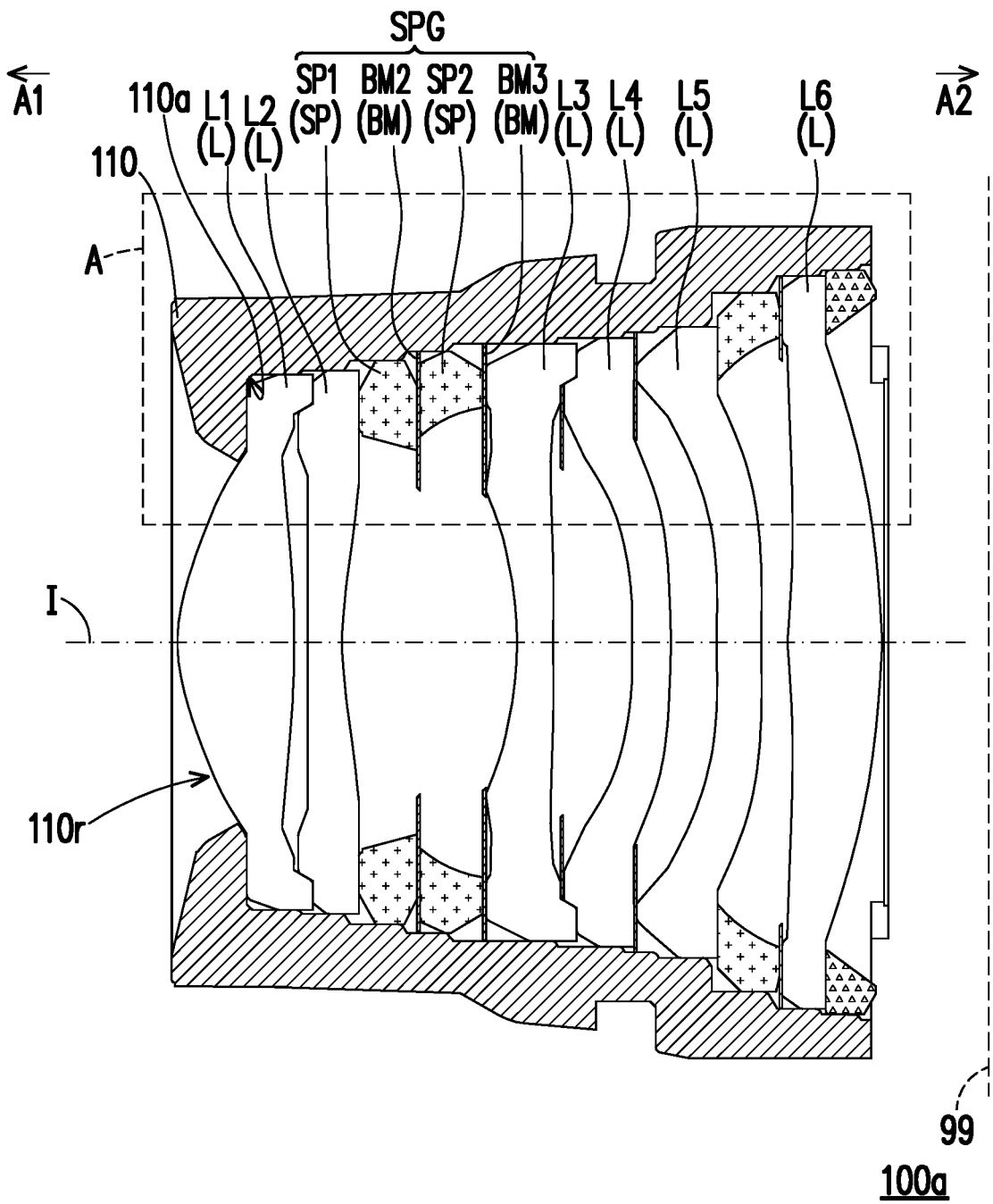
FIG. 5 is a schematic cross-sectional view of an optical imaging lens according to a second embodiment of the invention.

An optical imaging lens 100a in the embodiment of FIG. 5 is substantially similar to the optical imaging lens 100 of FIG. 1, and a main difference there between is that the spacer assembly SPG of the optical imaging lens 100a and the spacer assembly SPG of the optical imaging lens 100 are different.

Referring to FIG. 5, similarly, in the optical imaging lens 100a, the spacer assembly SPG also includes the front spacer SP1, the rear spacer SP2, and the middle light-shielding sheet BM2 sandwiched between the front spacer SP1 and the rear spacer SP2. A difference from the optical imaging lens 100 of FIG. 1 is that the spacer assembly SPG of the optical imaging lens 100a of FIG. 5 may selectively include a rear light-shielding sheet BM3 without including the front light-shielding sheet BM1 of FIG. 1.

Referring to FIG. 5, to be specific, in the embodiment, the spacer assembly SPG includes the front spacer SP1, the middle light-shielding sheet BM2, the rear spacer SP2, and the rear light-shielding sheet BM3 sequentially arranged from the object side A1 toward the image side A2, and the rear light-shielding sheet BM3 is arranged between the rear spacer SP2 and a first lens element L (for example: the lens element L3) obtained when counting from the rear spacer SP2 toward the image side A2.

Figure 6:
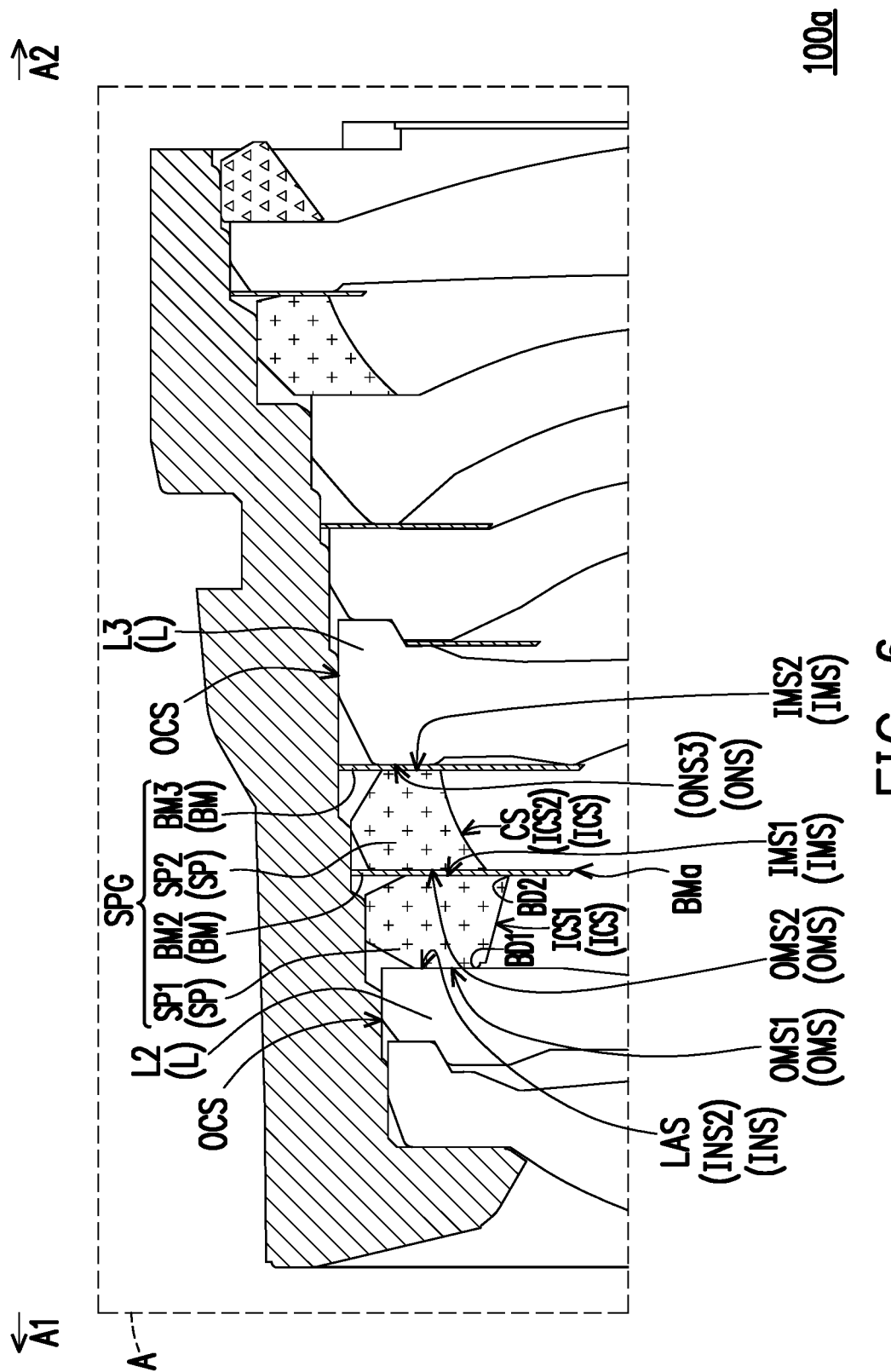
FIG. 6 is an enlarged schematic view of an area A in FIG. 5.

Referring to FIG. 5 and FIG. 6, in the optical imaging lens 100a of the embodiment, the object-side mechanical surface OMS1 of the front spacer SP1 directly bears on the image-side non-optical effective surface INS2 of the lens element L2, the image-side mechanical surface IMS1 of the front spacer SP1 directly bears on the middle light-shielding sheet BM2, and the middle light-shielding sheet BM2 is directly sandwiched between the image-side mechanical surface IMS1 of the front spacer SP1 and the object-side mechanical surface OMS2 of the rear spacer SP2, and the object-side mechanical surface OMS2 of the rear spacer SP2 directly bears on the middle light-shielding sheet BM2, the image-side mechanical surface IMS2 of the rear spacer SP2 directly bears on the rear light-shielding sheet BM3, and the rear light-shielding sheet BM3 is directly sandwiched between the image-side mechanical surface IMS2 of the rear spacer SP2 and the object-side non-optical effective surface ONS3 of the lens element L3.

Figure 7:
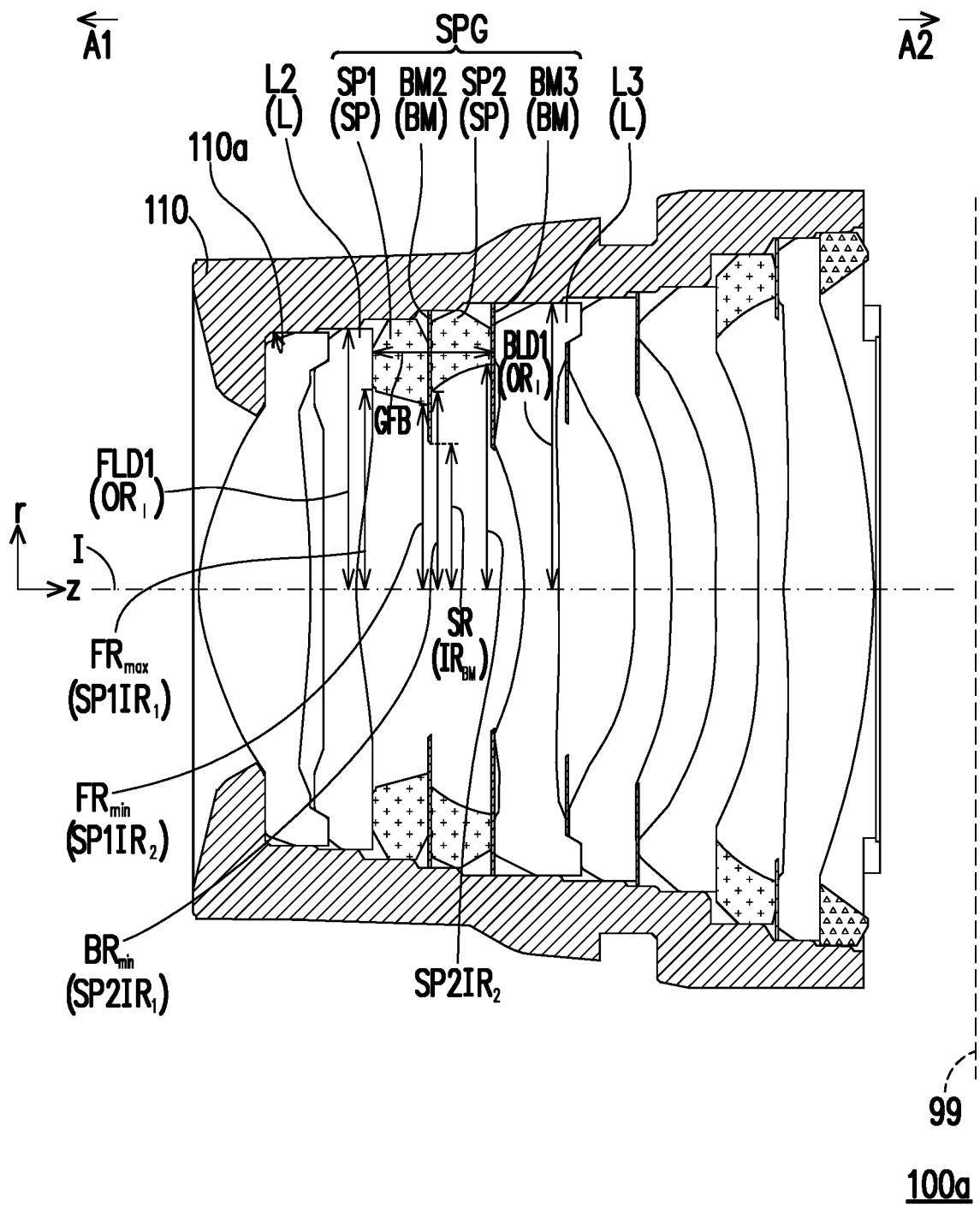
FIG. 7 is a schematic diagram illustrating various parameters of the embodiment of FIG. 5.

Referring to FIG. 5 to FIG. 7, parameter definitions that are different from that of the above embodiments are listed below, and the above embodiments may be referred for description of other parameters:

(a1'/a2') is a ratio of the first area a1' to the second area a2' of the rear spacer SP2, where the object-side mechanical surface OMS2 of the rear spacer SP2 has the first area a1', and the first area a1' is a bearing area with the middle light-shielding sheet BM2, the image-side mechanical surface IMS2 of the rear spacer SP2 has the second area a2', and the second area a2' is a bearing area with an optical element (for example: the rear light-shielding sheet BM3).

In addition, a relationship of the important parameters in the optical imaging lens 100a of the second embodiment is shown in FIG. 14.

Referring to FIG. 5 to FIG. 7, technical effects brought by designs different from that of the aforementioned embodiments are listed below. Except that the designs different from that of the aforementioned embodiments are listed below, the optical imaging lens 100a of the second embodiment may also meet other designs of the aforementioned embodiments, which is not repeated here.

Referring to FIG. 5 to FIG. 7, the object-side mechanical surface OMS2 of the rear spacer SP2 has the first area a1', the first area a1' is a bearing area with the middle light-shielding sheet BM2, and the image-side mechanical surface IMS2 of the rear spacer SP2 has the second area a2', the second area a2' is a bearing area with an optical element (for example: the rear light-shielding sheet BM3), and the ratio of the first area a1' to the second area a2' of the rear spacer SP2 is greater than or equal to 0.700, i.e., the optical imaging lens 100a satisfies a following conditional expression: (a1'/a2')≥0.700.

In other words, the ratio of the contact area between the middle light-shielding sheet BM2 and the rear spacer SP2 to the contact area between the rear spacer SP2 and the rear light-shielding sheet BM3 is maintained to a certain range; if the ratio is less than 0.700, the middle light-shielding sheet BM2 and/or the rear light-shielding sheet BM3 are more easily deformed and warped after being assembled or subjected to force, and cannot effectively absorb unnecessary light, thereby adversely affecting the optical quality.

Referring to FIG. 5 to FIG. 7, in the optical imaging lens 100a, the spacer assembly SPG further includes the rear light-shielding sheet BM3, which is arranged between the rear spacer SP2 and a first lens element L (for example: the lens element L3) obtained when counting from the rear spacer SP2 toward the image side A2. The use of the rear light-shielding sheet BM3 may simplify a manufacturing process of the lens element L3, so that the lens element L3 may be assembled after molding without performing any other processing procedures (such as ink coating).

Referring to FIG. 5 to FIG. 7, in the implementation of the optical imaging lens 100a of FIG. 5, the image-side non-optical effective surface INS2 of a first lens element L (for example, the lens element L2) obtained when counting from the spacer assembly SPG toward the object side A1 is the light-absorbing surface LAS. The light-absorbing surface LAS of the image-side non-optical effective surface INS2 of the lens element L2 may absorb unnecessary light to reduce generation of stray light, and save the use of light-shielding sheet between the front spacer SP1 and the lens element L2. Thus, an assembling time of the optical imaging lens 100a may be shortened to reduce the production cost.

Figure 8:
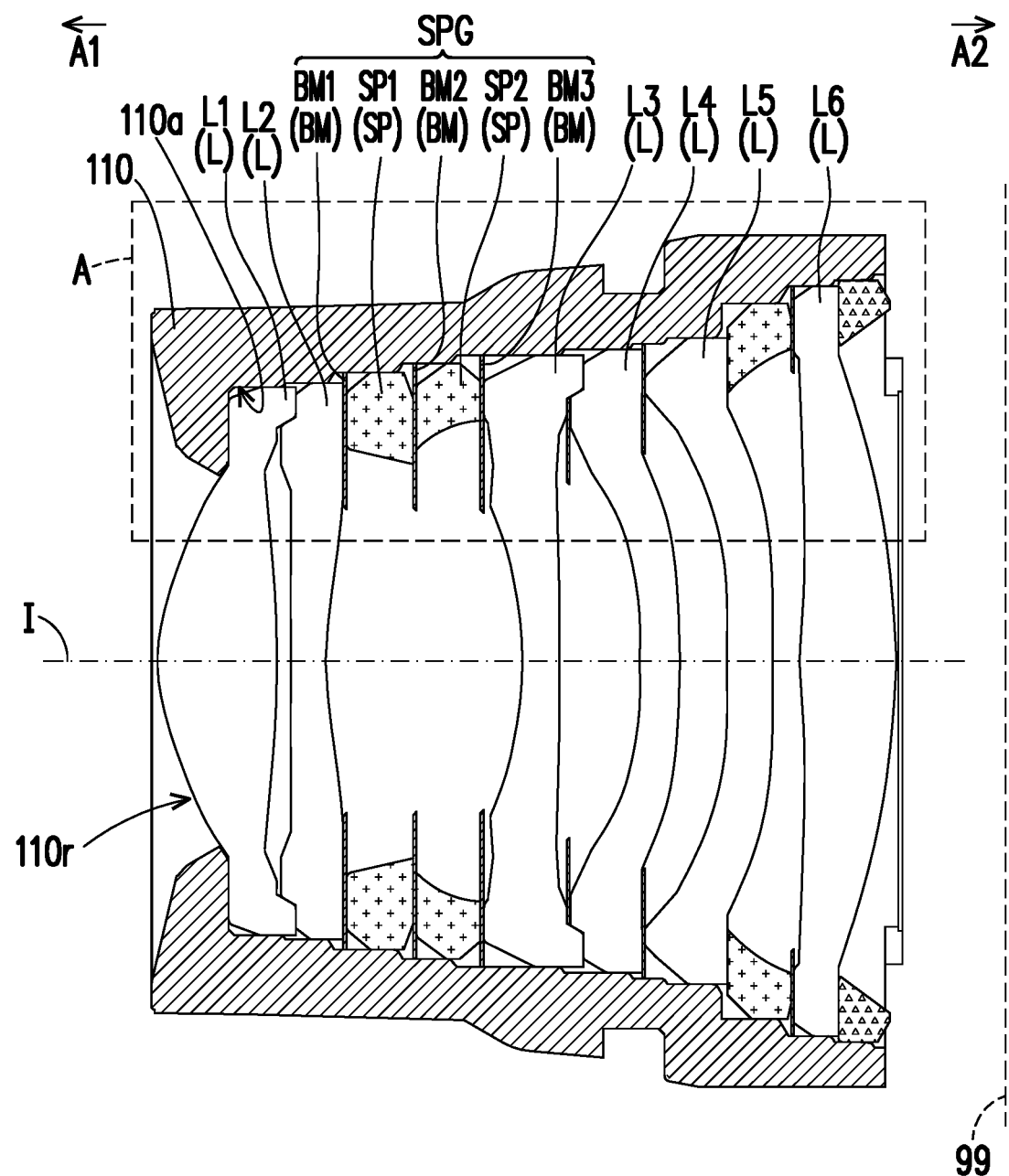
FIG. 8 is a schematic cross-sectional view of an optical imaging lens according to a third embodiment of the invention.

An optical imaging lens 100b in the embodiment of FIG. 8 is substantially similar to the optical imaging lens 100 of FIG. 1, and a main difference there between is that the spacer assembly SPG of the optical imaging lens 100b and the spacer assembly SPG of the optical imaging lens 100 are different.

Referring to FIG. 8, to be specific, in the optical imaging lens 100b, besides the front light-shielding sheet BM1 and the middle light-shielding sheet BM2, the spacer assembly SPG may further optionally includes the rear light-shielding sheet BM3, where the front light-shielding sheet BM1, the front spacer SP1, the middle light-shielding sheet BM2, the rear spacer SP2, and the rear light-shielding sheet BM3 are sequentially arranged from the object side A1 to the image side A2, and the rear light-shielding sheet BM3 is arranged between a first lens element L (for example: the lens element L3) obtained when counting from the rear spacer SP2 toward the image side A2 and the rear spacer SP2.

Figure 9:
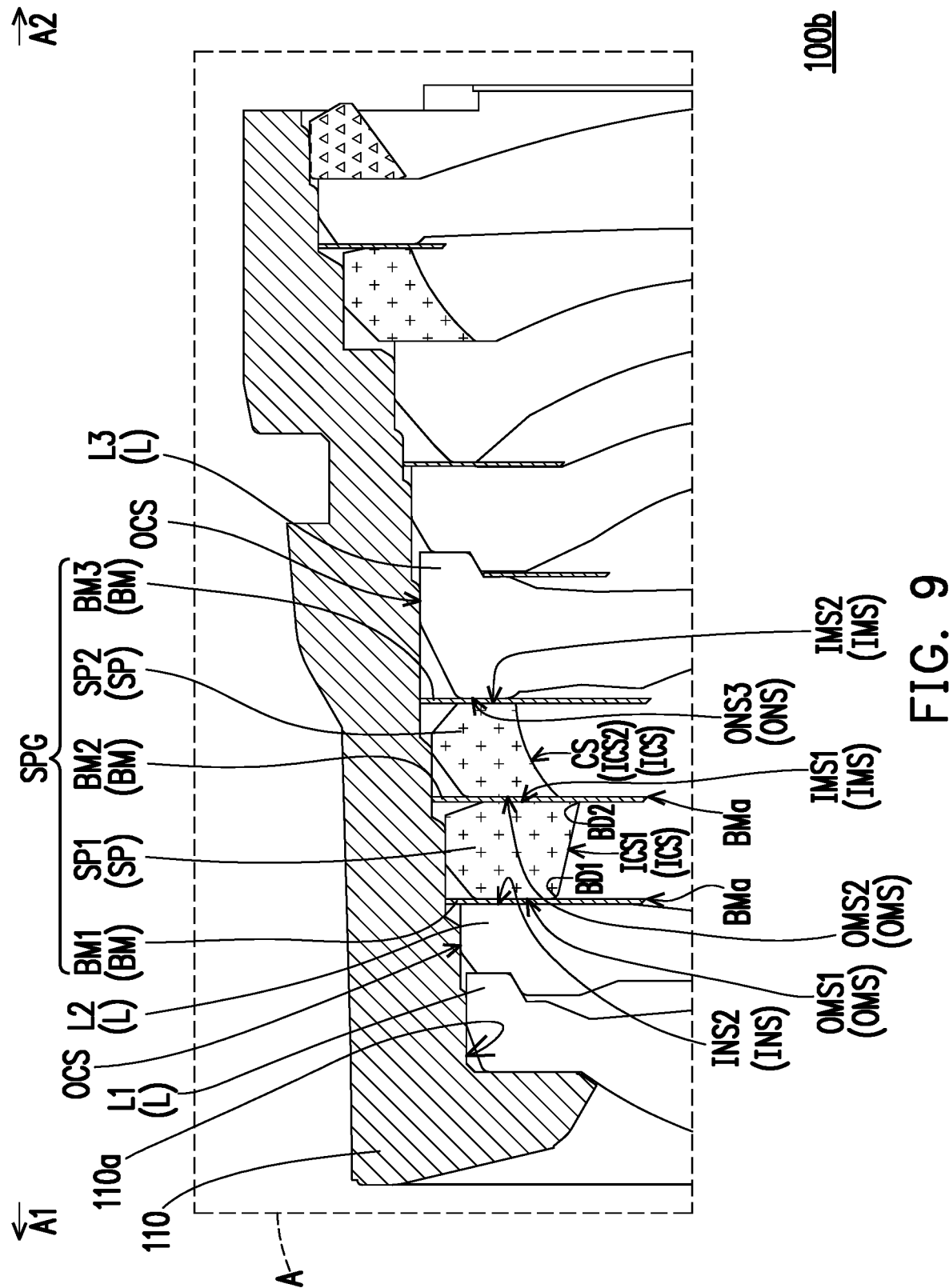
FIG. 9 is an enlarged schematic view of an area A in FIG. 8.

Referring to FIG. 8 and FIG. 9, in the optical imaging lens 100b of the embodiment, the object-side mechanical surface OMS1 of the front spacer SP1 directly bears on the front light-shielding sheet BM1, the image-side mechanical surface IMS1 of the front spacer SP1 directly bears on the middle light-shielding sheet BM2, and the middle light-shielding sheet BM2 is directly sandwiched between the image-side mechanical surface IMS1 of the front spacer SP1 and the object-side mechanical surface OMS2 of the rear spacer SP2, and the object-side mechanical surface OMS2 of the rear spacer SP2 directly bears on the middle light-shielding sheet BM2, the image-side mechanical surface IMS2 of the rear spacer SP2 directly bears on the rear light-shielding sheet BM3, and the rear light-shielding sheet BM3 is directly sandwiched between the image-side mechanical surface IMS2 of the rear spacer SP2 and the object-side non-optical effective surface ONS3 of the lens element L3.

Figure 10:
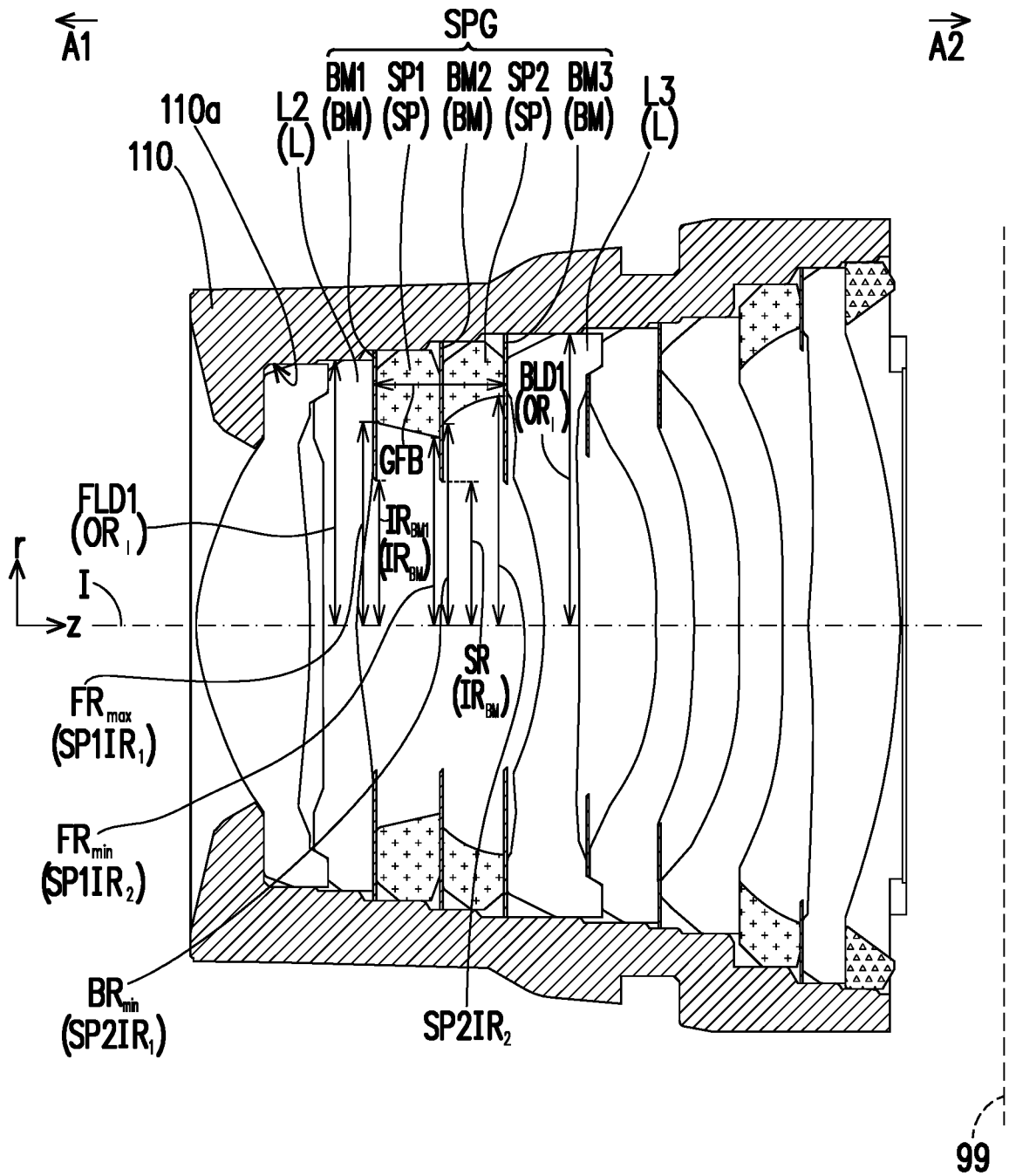
FIG. 10 is a schematic diagram illustrating various parameters of the embodiment of FIG. 8.

Referring to FIG. 8 to FIG. 10, parameter definitions that are different from that of the above embodiments are listed below, and the above embodiments may be referred for description of other parameters:

(a2/a1) is a ratio of the second area a2 to the first area a1 of the front spacer SP1, where an optical element (for example: the front light-shielding sheet BM1), the front spacer SP1, the middle light-shielding sheet BM2, and the rear spacer SP2 are sequentially arranged from the object side A1 to the image side A2, the object-side mechanical surface OMS of the front spacer SP1 has the first area a1, and the first area a1 is a bearing area with the optical element (for example: the front light-shielding sheet BM1), the image-side mechanical surface IMS of the front spacer SP1 has the second area a2, and the second area a2 is a bearing area with the middle light-shielding sheet BM2.

In addition, a relationship of the important parameters in the optical imaging lens 100b of the third embodiment is shown in FIG. 14.

Referring to FIG. 8 to FIG. 10, technical effects brought by designs different from that of the aforementioned embodiments are listed below. Except that the designs different from that of the aforementioned embodiments are listed below, the optical imaging lens 100b of the third embodiment may also meet other designs of the aforementioned embodiments, and details thereof may refer to the above embodiments, which are not repeated.

Referring to FIG. 8 to FIG. 10, in the optical imaging lens 100b, an optical element (for example: the front light-shielding sheet BM1), the front spacer SP1, the middle light-shielding sheet BM2, the rear spacer SP2 and another optical element (for example: the rear light-shielding sheet BM3) are sequentially arranged from the object side A1 to the image side A2; the object-side mechanical surface OMS1 of the front spacer SP1 has the first area a1, the first area a1 is a bearing area with an optical element (for example: the front light-shielding sheet BM1); and the image-side mechanical surface IMS1 of the front spacer SP1 has the second area a2, the second area a2 is a bearing area with the middle light-shielding sheet BM2, and the ratio of the second area a2 to the first area a1 of the front spacer SP1 is greater than or equal to 0.850, i.e., the optical imaging lens 100b satisfies a following conditional expression: (a2/a1) ≥0.850.

Referring to FIG. 8, FIG. 9 and FIG. 10, in the optical imaging lens 100b, the spacer assembly SPG further includes the front light-shielding sheet BM1 and the rear light-shielding sheet BM3, where the use of the front light-shielding sheet BM1 and the rear light-shielding sheet BM3 may simplify manufacturing processes of the two lens elements L2 and L3 respectively located in front of and after the spacer assembly SPG, so that the lens elements L2 and L3 may be assembled after molding without performing any other processing procedures (such as ink coating).

Figure 11:
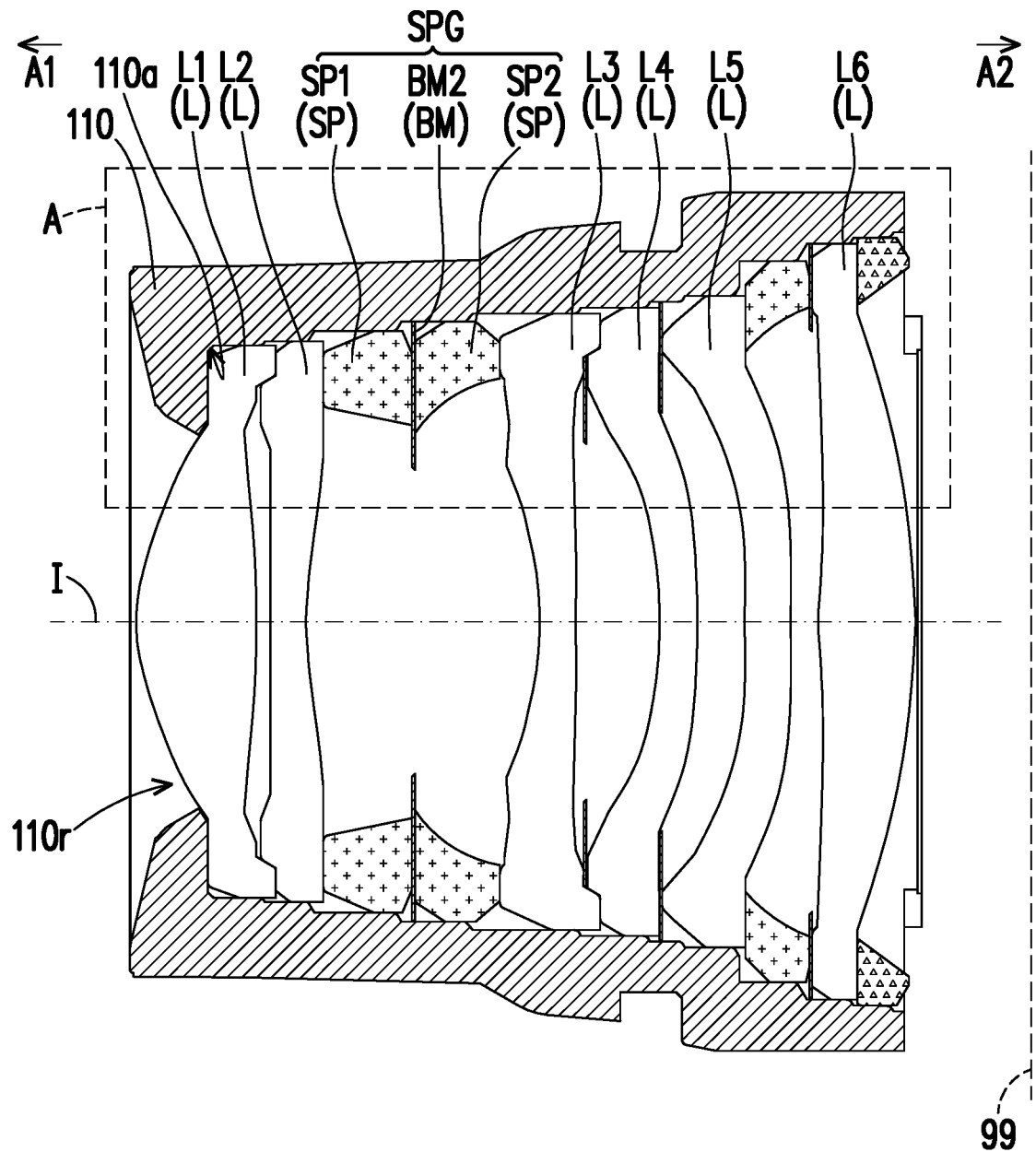
FIG. 11 is a schematic cross-sectional view of an optical imaging lens according to a fourth embodiment of the invention.

An optical imaging lens 100c in the embodiment of FIG. 11 is substantially similar to the optical imaging lens 100 of FIG. 1, and a main difference there between is that the spacer assembly SPG of the optical imaging lens 100c and the spacer assembly SPG of the optical imaging lens 100 are different.

Referring to FIG. 11, to be specific, in the optical imaging lens 100c, the spacer assembly SPG includes the front spacer SP1, the middle light-shielding sheet BM2, and the rear spacer SP2, but does not include the front light-shielding sheet BM1 and the rear light-shielding sheet BM3, where an optical element (for example: the lens element L2), the front spacer SP1, and the middle light-shielding sheet BM2, the rear spacer SP2, and an optical element (for example, the lens element L3) are sequentially arranged from the object side A1 to the image side A2.

Figure 12:
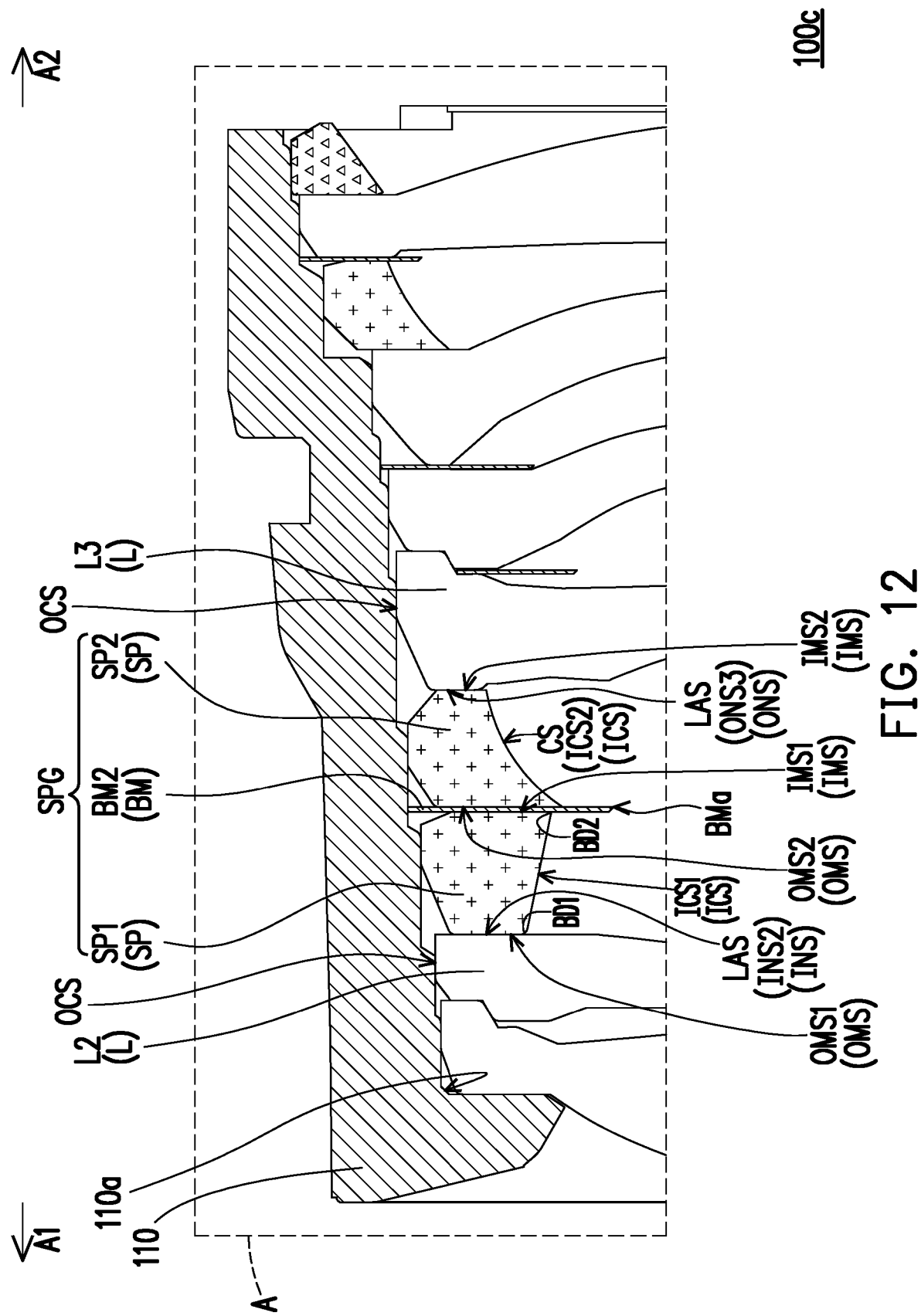
FIG. 12 is an enlarged schematic view of an area A in FIG. 11.

Referring to FIG. 11 and FIG. 12, in the optical imaging lens 100c of the embodiment, the object-side mechanical surface OMS1 of the front spacer SP1 directly bears on the image-side non-optical effective surface INS2 of the lens element L2, the image-side mechanical surface IMS1 of the front spacer SP1 directly bears on the middle light-shielding sheet BM2, and the middle light-shielding sheet BM2 is directly sandwiched between the image-side mechanical surface IMS1 of the front spacer SP1 and the object-side mechanical surface OMS2 of the rear spacer SP2, and the image-side mechanical surface IMS2 of the rear spacer SP2 directly bears on the object-side non-optical effective surface ONS3 of the lens element L3.

Figure 13:
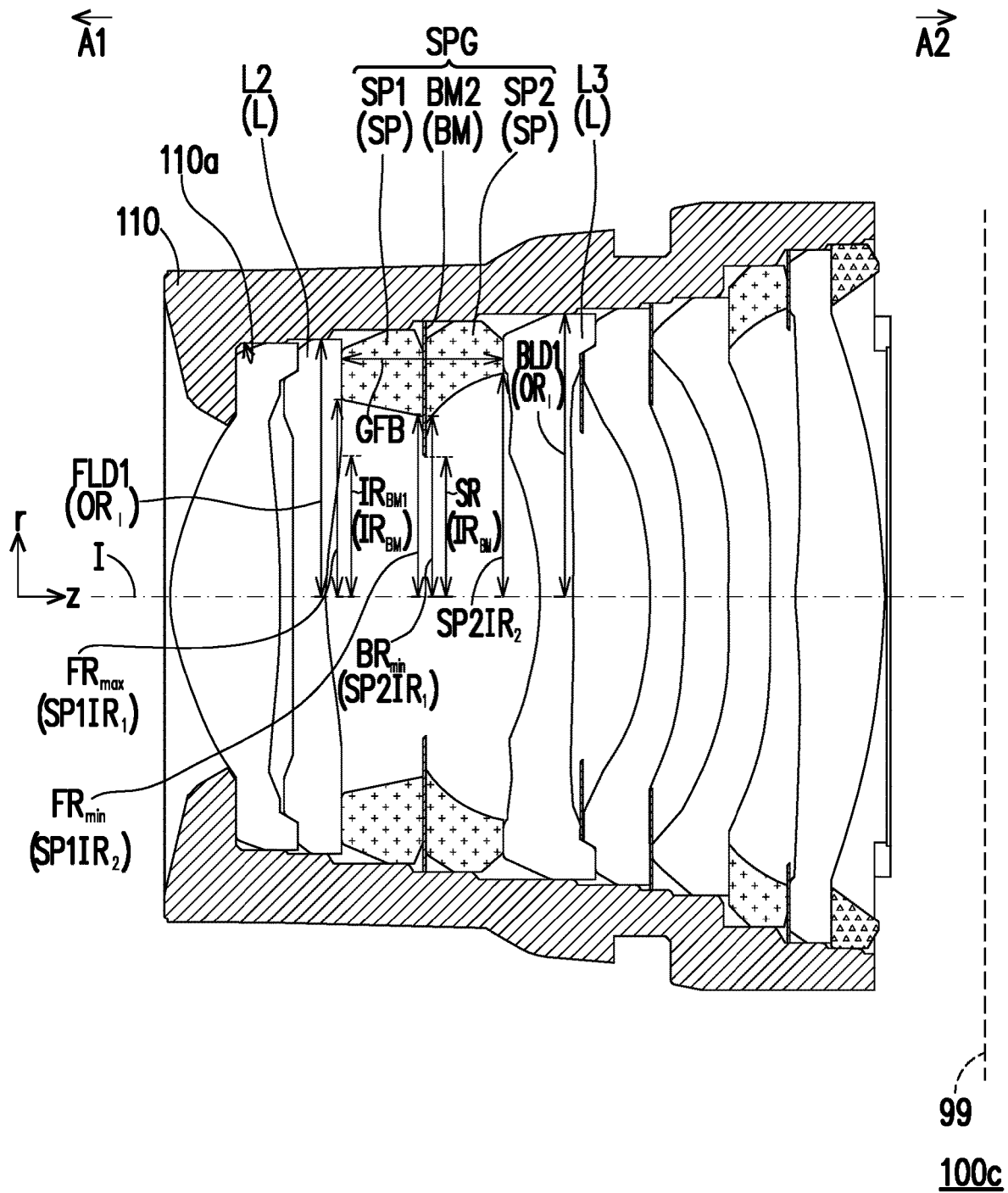
FIG. 13 is a schematic diagram illustrating various parameters of the embodiment of FIG. 11.

Referring to FIG. 11 to FIG. 13, parameter definitions that are different from that of the above embodiments are listed below, and the above embodiments may be referred for description of other parameters:

(a2/a1) is a ratio of the second area a2 to the first area a1 of the front spacer SP1, where an optical element (for example: the lens element L2), the front spacer SP1, the middle light-shielding sheet BM2, and the rear spacer SP2 are sequentially arranged from the object side A1 to the image side A2, the object-side mechanical surface OMS1 of the front spacer SP1 has the first area a1, and the first area a1 is a bearing area with an optical element (for example: the lens element L2), the image-side mechanical surface IMS1 of the front spacer SP1 has the second area a2, and the second area a2 is a bearing area with the middle light-shielding sheet BM2;

(a1'/a2') is a ratio of the first area a1' to the second area a2' of the rear spacer SP2, where the object-side mechanical surface OMS2 of the rear spacer SP2 has the first area a1', and the first area a1' is a bearing area with the middle light-shielding sheet BM2, the image-side mechanical surface IMS2 of the rear spacer SP2 has the second area a2', and the second area a2' is a bearing area with an optical element (for example: the lens element L3).

In addition, a relationship of the important parameters in the optical imaging lens 100c of the fourth embodiment is shown in FIG. 14.

Referring to FIG. 11 to FIG. 13, technical effects brought by designs different from that of the aforementioned embodiments are listed below. Except that the designs different from that of the aforementioned embodiments are listed below, the optical imaging lens 100c of the fourth embodiment may also meet other designs of the aforementioned embodiments, which is not repeated.

Referring to FIG. 11 to FIG. 13 at the same time, in the optical imaging lens 100c, an optical element (for example: the lens element L2), the front spacer SP1, the middle light-shielding sheet BM2, the rear spacer SP2 are sequentially arranged from the object side A1 to the image side A2; the object-side mechanical surface OMS1 of the front spacer SP1 has the first area a1, the first area a1 is a bearing area with an optical element (for example: the lens element L2); the image-side mechanical surface IMS1 of the front spacer SP1 has the second area a2, and the second area a2 is a bearing area with the middle light-shielding sheet BM2; the ratio of the second area a2 to the first area a1 (a2/a1) of the front spacer SP1 is greater than or equal to 0.850, i.e., the optical imaging lens 100c satisfies a following conditional expression: (a2/a1)≥0.850.

Referring to FIG. 11 to FIG. 13, the object-side mechanical surface OMS2 of the rear spacer SP2 has the first area a1', and the first area a1' is a bearing area with the middle light-shielding sheet BM2, and the image-side mechanical surface IMS2 of the rear spacer SP2 has the second area a2', the second area a2' is a bearing area with an optical element (for example: the lens element L3), and the ratio of the first area a1' to the second area a2' of the rear spacer SP2 is greater than or equal to 0.700, i.e., the optical imaging lens 100 satisfies a following conditional expression: (a1'/a2') ≥0.700.

Referring to FIG. 11 and FIG. 12, in the embodiment of the optical imaging lens 100c, the image-side non-optical effective surface INS2 of a first lens element L (for example: the lens element L2) obtained when counting from the spacer assembly SPG toward the object side A1 is a light-absorbing surface LAS, and the object-side non-optical effective surface ONS3 of a first lens element L (for example: the lens element L3) obtained when counting from the spacer assembly SPG toward the image side A2 is a light-absorbing surface LAS.

The light-absorbing surface LAS of the image-side non-optical effective surface INS2 of the lens element L2 and the light-absorbing surface LAS of the object-side non-optical effective surface ONS3 of the lens element L3 may absorb unnecessary light to reduce generation of stray light, and save the use of the light-shielding sheet between the front spacer SP1 and the lens element L2 and the light-shielding sheet between the rear spacer SP2 and the lens element L3. Thus, an assembling time of the optical imaging lens 100c may be shortened to reduce the production cost.

In summary, in the optical imaging lens of the embodiment of the invention, the spacer assembly includes the front spacer, the middle light-shielding sheet, and the rear spacer that are sequentially arranged from the object side to the image side. The middle light-shielding sheet is disposed between the front spacer and the rear spacer, which may effectively block unnecessary light and prevent the light from being reflected into the optical imaging lens by the inner connecting surface of the spacer. Therefore, the optical quality of the optical imaging lens may be improved.

In addition, the ratio of the bearing area between the front spacer and the middle light-shielding sheet behind the front spacer to the bearing area between the front spacer and the optical element in front of the front spacer is more than a suitable value, and/or the ratio of the bearing area between the rear spacer and the middle light-shielding sheet in front of the rear spacer to the bearing area between the rear spacer and the optical element behind the rear spacer is more than a suitable value. In this way, the light-shielding sheet is not easily deformed and warped after being assembled or subjected to force, and may effectively absorb unnecessary light, thereby improving the optical quality.

What is claimed is:

1. A spacer assembly, suitable of being applied in an optical imaging lens with an optical axis, the optical imaging lens comprises a lens barrel, the lens barrel has an inner circumferential surface surrounding the optical axis of the optical imaging lens, the inner circumferential surface is used to define an installation space, the installation space is used to accommodate the spacer assembly, and he spacer assembly comprising:
   a front spacer;
   a rear spacer; and
   a middle light-shielding sheet, wherein an optical element, the front spacer, the middle light-shielding sheet, and the rear spacer are sequentially arranged from an object side to an image side, and each of the front spacer and the rear spacer has an object-side mechanical surface facing the object side and an image-side mechanical surface facing the image side,
   the object-side mechanical surface of the front spacer has a first area, the first area is a bearing area with the optical element, the image-side mechanical surface of the front spacer has a second area, the second area is a second area bearing against the middle light-shielding sheet, and a ratio of the second area to the first area of the front spacer is greater than or equal to 0.850, and
   the object-side mechanical surface of the rear spacer bears on the middle light-shielding sheet;
   wherein the middle light-shielding sheet is disposed between the front spacer and the rear spacer, such that the middle light-shielding sheet is limited by the inner circumferential surface of the lens barrel while being supported by the front spacer and the rear spacer, which are independently disposed;
   wherein the rear spacer further has an inner connecting surface, the inner connecting surface of the rear spacer connects the object-side mechanical surface and the image-side mechanical surface of the rear spacer and faces the optical axis, the inner connecting surface of the rear spacer comprises an arc-shaped curved surface, the arc-shaped curved surface is curved in a horizontal direction parallel to the optical axis, and the arc-shaped curved surface is a concave surface;
   wherein the optical imaging lens comprises a plurality of lens elements, the lens elements are sequentially arranged along the optical axis from the object side to the image side; each of the lens elements comprises an assembling portion extending radially outward from an optical boundary, and the assembling portion has an object-side non-optical effective surface facing the object side and an image-side non-optical effective surface facing the image side; and the object-side non-optical effective surface of a first lens obtained when counting from the spacer assembly toward the image side is a light-absorbing surface.

2. The spacer assembly as claimed in claim 1, wherein each of the lens elements further has an outer connecting surface connecting the object-side non-optical effective surface and the image-side non-optical effective surface of each of the lens elements, the outer connecting surface of each of the lens elements faces away from the optical axis, and a maximum distance between the outer connecting surface of each of the lens elements and the optical axis in a vertical direction is an outer diameter of each of the lens elements; the outer diameter of a first lens obtained when counting from the spacer assembly toward the object side is FLD1, the outer diameter of the first lens obtained when counting from the spacer assembly toward the image side is BLD1, and $0.850 \le (FLD1/BLD1) \le 1.150$.

3. The spacer assembly as claimed in claim 1, wherein the front spacer further has an inner connecting surface, the inner connecting surface of the front spacer connects the object-side mechanical surface and the image-side mechanical surface of the front spacer and faces the optical axis, the object-side mechanical surface and the inner connecting surface of the front spacer have a first boundary, a distance between the first boundary and the optical axis in a vertical direction is a first inner diameter of the front spacer, the vertical direction is perpendicular to the optical axis, the image-side mechanical surface and the inner connecting surface of the front spacer have a second boundary, and a distance between the second boundary and the optical axis in the vertical direction is a second inner diameter of the front spacer; and the first inner diameter of the front spacer is greater than the second inner diameter of the front spacer.

4. The spacer assembly as claimed in claim 1, wherein the front spacer further has an inner connecting surface, and the inner connecting surface of the front spacer connects the object-side mechanical surface and the image-side mechanical surface of the front spacer and faces the optical axis; a vertical direction is perpendicular to the optical axis; a minimum distance between the inner connecting surface of the front spacer and the optical axis in the vertical direction is a minimum inner diameter $FR_{min}$ of the front spacer, a maximum distance between the inner connecting surface of the front spacer and the optical axis in the vertical direction is a maximum inner diameter $FR_{max}$ of the front spacer, and $(FR_{max}/FR_{min}) \le 1.200$.

5. The spacer assembly as claimed in claim 1, wherein the front spacer further has an inner connecting surface, the inner connecting surface of the front spacer connects the object-side mechanical surface and the image-side mechanical surface of the front spacer, and the inner connecting surface of the front spacer faces the optical axis; a vertical direction is perpendicular to the optical axis; a minimum distance between an inner edge of the middle light-shielding sheet and the optical axis in the vertical direction is a minimum inner diameter of the middle light-shielding sheet; a minimum distance between the inner connecting surface of the front spacer and the optical axis in the vertical direction is a minimum inner diameter of the front spacer; a minimum distance between the inner connecting surface of the rear spacer and the optical axis in the vertical direction is a minimum inner diameter of the rear spacer; and the minimum inner diameter of the middle light-shielding sheet is less than the minimum inner diameter of the front spacer and the minimum inner diameter of the rear spacer.

6. The spacer assembly as claimed in claim 1, wherein the optical imaging lens comprises a plurality of lens elements, the lens elements are sequentially arranged along the optical axis from the object side to the image side, and the spacer assembly further comprises:
   a front light-shielding sheet, disposed between a first lens obtained when counting from the front spacer toward the object side.

7. The spacer assembly as claimed in claim 1, wherein the optical imaging lens comprises a plurality of lens elements, the lens elements are sequentially arranged along the optical axis from the object side to the image side, and the spacer assembly further comprises:
   a front light-shielding sheet, disposed between a first lens obtained when counting from the front spacer toward the object side and the front spacer; and
   a rear light-shielding sheet, disposed between the rear spacer and a first lens obtained when counting from the rear spacer toward the image side.

8. The spacer assembly as claimed in claim 1, wherein the optical imaging lens comprises a plurality of lens elements, the lens elements are sequentially arranged along the optical axis from the object side to the image side; and the image-side non-optical effective surface of a first lens obtained when counting from the spacer assembly toward the object side is a light-absorbing surface.

9. The spacer assembly as claimed in claim 1, wherein the front spacer further has an inner connecting surface, and the inner connecting surface of the front spacer connects the object-side mechanical surface and the image-side mechanical surface of the front spacer and faces the optical axis; a vertical direction is perpendicular to the optical axis; a minimum distance between the inner connecting surface of the front spacer and the optical axis in the vertical direction is a minimum inner diameter $FR_{min}$ of the front spacer; a minimum distance between an inner edge of the middle light-shielding sheet and the optical axis in the vertical direction is a minimum inner diameter SR of the middle light-shielding sheet; and $FR_{min}/SR \leq 1.600$.

10. The spacer assembly as claimed in claim 1, wherein the optical imaging lens comprises a plurality of lens elements, and the lens elements are sequentially arranged along the optical axis from the object side to the image side; the object-side non-optical effective surface and the image-side non-optical effective surface are configured to receive a bearing force; the image-side non-optical effective surface of a first lens obtained when counting from the middle light-shielding sheet toward the object side and the object-side non-optical effective surface of a first lens obtained when counting from the middle light-shielding sheet toward the image side have a minimum distance in a horizontal direction parallel to the optical axis, and the minimum distance is greater than or equal to 0.600 mm.

11. A spacer assembly, suitable of being applied in an optical imaging lens with an optical axis, the optical imaging lens comprises a lens barrel, the lens barrel has an inner circumferential surface surrounding the optical axis of the optical imaging lens, the inner circumferential surface is used to define an installation space, the installation space is used to accommodate the spacer assembly, and the spacer assembly comprising:
   a front spacer;
   a rear spacer; and
   a middle light-shielding sheet, wherein the front spacer, the middle light-shielding sheet, the rear spacer, and an optical element are sequentially arranged from an object side to an image side, and each of the front spacer and the rear spacer has an object-side mechanical surface facing the object side and an image-side mechanical surface facing the image side,
   the object-side mechanical surface of the rear spacer has a first area, the first area is a bearing area with the middle light-shielding sheet, the image-side mechanical surface of the rear spacer has a second area, the second area is a bearing area with the optical element, and a ratio of the first area to the second area of the rear spacer is greater than or equal to 0.700, and
   the object-side mechanical surface of the front spacer bears on the middle light-shielding sheet;
   wherein the middle light-shielding sheet is disposed between the front spacer and the rear spacer, such that the middle light-shielding sheet is limited by the inner circumferential surface of the lens barrel while supported by the front spacer and the rear spacer, which are independently disposed;
   wherein the rear spacer further has an inner connecting surface, the inner connecting surface of the rear spacer connects the object-side mechanical surface and the image-side mechanical surface of the rear spacer and faces the optical axis, and the inner connecting surface of the rear spacer comprises an arc-shaped curved surface, the arc-shaped curved surface is curved in a horizontal direction parallel to the optical axis, and the arc-shaped curved surface is a concave surface;
   wherein the optical imaging lens comprises a plurality of lens elements, the lens elements are sequentially arranged along the optical axis from the object side to the image side; each of the lens elements comprises an assembling portion extending radially outward from an optical boundary, and the assembling portion has an object-side non-optical effective surface facing the object side and an image-side non-optical effective surface facing the image side; and the object-side non-optical effective surface of a first lens obtained when counting from the spacer assembly toward the image side is a light-absorbing surface.

12. The spacer assembly as claimed in claim 11, wherein the optical imaging lens comprises a plurality of lens elements, and the lens elements are sequentially arranged along the optical axis from the object side to the image side; each of the lens elements further has an outer connecting surface connecting the object-side non-optical effective surface and the image-side non-optical effective surface of each of the lens elements, the outer connecting surface of each of the lens elements faces away from the optical axis, and a maximum distance between the outer connecting surface of each of the lens elements and the optical axis in a vertical direction is an outer diameter of each of the lens elements; the outer diameter of a first lens obtained when counting from the spacer assembly toward the object side is FLD1, the outer diameter of the first lens obtained when counting from the spacer assembly toward the image side is BLD1, and $0.850 \leq (FLD1/BLD1) \leq 1.150$.

13. The spacer assembly as claimed in claim 11, wherein the object-side mechanical surface and the inner connecting surface of the rear spacer have a first boundary, a distance between the first boundary of the rear spacer and the optical axis in a vertical direction is a first inner diameter of the rear spacer; the vertical direction is perpendicular to the optical axis; the image-side mechanical surface and the inner connecting surface of the rear spacer have a second boundary, and a distance between the second boundary of the rear spacer and the optical axis in the vertical direction is a second inner diameter of the rear spacer; and the first inner diameter of the rear spacer is less than the second inner diameter of the rear spacer.

14. The spacer assembly as claimed in claim 11, wherein the front spacer further has an inner connecting surface, and the inner connecting surface of the front spacer connects the object-side mechanical surface and the image-side mechanical surface of the front spacer and faces the optical axis; a vertical direction is perpendicular to the optical axis; a minimum distance between the inner connecting surface of the front spacer and the optical axis in the vertical direction is a minimum inner diameter $FR_{min}$ of the front spacer, a maximum distance between the inner connecting surface of the front spacer and the optical axis in the vertical direction is a maximum inner diameter $FR_{max}$ of the front spacer, and $(FR_{max}/FR_{min}) \leq 1.200$.

15. The spacer assembly as claimed in claim 11, wherein the optical imaging lens comprises a plurality of lens elements, the lens elements are sequentially arranged along the optical axis from the object side to the image side, and the spacer assembly further comprises:
  a rear light-shielding sheet, disposed between the rear spacer and a first lens obtained when counting from the rear spacer toward the image side.

16. The spacer assembly as claimed in claim 11, wherein the optical imaging lens comprises a plurality of lens elements, the lens elements are sequentially arranged along the optical axis from the object side to the image side; each of the lens elements comprises an assembling portion extending radially outward from an optical boundary.

17. The spacer assembly as claimed in claim 11, wherein the optical imaging lens comprises a plurality of lens elements, the lens elements are sequentially arranged along the optical axis from the object side to the image side; each of the lens elements comprises an assembling portion extending radially outward from an optical boundary; the image-side non-optical effective surface of a first lens obtained when counting from the spacer assembly toward the object side is a light-absorbing surface.

18. The spacer assembly as claimed in claim 11, wherein the rear spacer further has an inner connecting surface, and the inner connecting surface of the rear spacer connects the object-side mechanical surface and the image-side mechanical surface of the rear spacer and faces the optical axis; a vertical direction is perpendicular to the optical axis; a minimum distance between an inner edge of the middle light-shielding sheet and the optical axis in the vertical direction is a minimum inner diameter SR of the middle light-shielding sheet; a minimum distance between the inner connecting surface of the rear spacer and the optical axis in the vertical direction is a minimum inner diameter $BR_{min}$ of the rear spacer; and $BR_{min}/SR \leq 1.600$.

19. The spacer assembly as claimed in claim 11, wherein a material of at least one of the front spacer and the rear spacer comprises plastic.

* * * * *